United States Patent
Miyahara et al.

(10) Patent No.: US 8,124,196 B2
(45) Date of Patent: Feb. 28, 2012

(54) FLUOROBICYCLO[2.2.2]OCTANE COMPOUND, METHOD OF PRODUCING THE SAME, AND APPLICATIONS THEREOF

(75) Inventors: Takashi Miyahara, Ashigarakami-gun (JP); Masayuki Harada, Ashigarakami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 68 days.

(21) Appl. No.: 12/722,108

(22) Filed: Mar. 11, 2010

(65) Prior Publication Data

US 2010/0231844 A1     Sep. 16, 2010

(30) Foreign Application Priority Data

Mar. 13, 2009     (JP) .................. 2009-060948

(51) Int. Cl.
*C09K 19/34* (2006.01)
*C09K 19/32* (2006.01)
*C07C 43/192* (2006.01)
*C07C 23/32* (2006.01)
*C07C 69/74* (2006.01)

(52) U.S. Cl. ............... 428/1.1; 252/299.62; 252/299.63; 568/669; 570/130; 570/131; 560/118

(58) Field of Classification Search ............ 252/299.63, 252/299.62; 428/1.1; 570/130, 131; 568/820, 568/669; 560/118
See application file for complete search history.

(56) References Cited

FOREIGN PATENT DOCUMENTS

DE     3906058 A1     9/1989

OTHER PUBLICATIONS

CAPLUS: 2006:804297, 2006.*

* cited by examiner

*Primary Examiner* — Shean Wu
(74) *Attorney, Agent, or Firm* — Buchanan Ingersoll & Rooney PC

(57) ABSTRACT

A liquid crystal composition comprising at least one compound having a fluorobicyclo[2.2.2]octane skeleton represented by formula (I) below is disclosed. A fluorobicyclo[2.2.2]octane compound represented by formula (II) below is also disclosed. In the formulae, Y represents a hydrogen atom or fluorine atom.

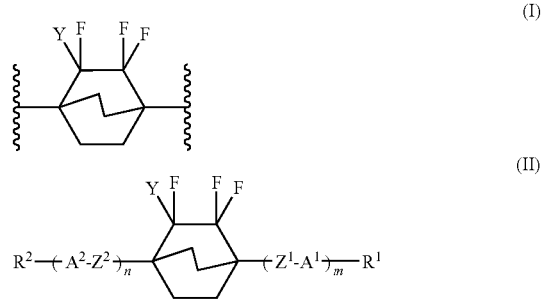

13 Claims, No Drawings

FLUOROBICYCLO[2.2.2]OCTANE COMPOUND, METHOD OF PRODUCING THE SAME, AND APPLICATIONS THEREOF

CROSS-REFERENCE TO RELATED APPLICATIONS

This application claims benefit of priority under 35 U.S.C. 119 to Japanese Patent Application No. 2009-060948, filed on Mar. 13, 2009, which is expressly incorporated herein by reference in its entirety.

BACKGROUND OF THE INVENTION

1. Technical Field

The present invention relates to a fluorobicyclo[2.2.2]octane compound which is useful typically as a liquid crystal material adoptable to liquid crystal elements, a method of producing the same, and applications thereof.

2. Background Art

In recent years, display elements using liquid-crystalline compounds (liquid crystal display elements) have extensively been expanding their ranges of application. The liquid crystal display elements use optical (refractive index) anisotropy ($\Delta n$) and dielectric anisotropy ($\Delta \varepsilon$), which are characteristics specific to liquid crystal compounds, and are applied to watch, calculator, various measuring instruments, automotive panel, word processor, electronic organizer, mobile phone, printer, computer, television set, and so forth.

The liquid crystal compounds show specific liquid crystal phases characterized between solid phase and liquid phase, and the liquid crystal phases may roughly be classified into nematic phase, smectic phase, and cholesteric phase. Among them, the nematic phase has most widely been adopted as the phase of liquid crystal for display elements, or so-called liquid crystal to be driven. Display modes of the liquid crystal display elements actually proposed at present include dynamic scattering (DS) type, guest-host (GH) type, twisted nematic (TN) type, super-twisted nematic (STN) type, thin-film transistor (TFT) type, and ferroelectric liquid crystal (FLC) type. Known driving systems include static driving system, time-division driving system, active-matrix driving system, and dual-frequency driving system.

The TN-mode liquid crystal display element is disadvantageous due to its low response speed and poor viewing-angle characteristics when it is used under the active-matrix driving system widely adopted at present, and remains problematic for applications such as TV, where the viewing-angle characteristics are highly appreciated. In contrast, the VA (vertical alignment) mode and the IPS (in-plane switching) mode are known to be advantageous in terms of wide viewing angle, short response time, high contrast and so forth. The VA mode is a mode most widely adopted to large-sized television set at present. Liquid crystal composition used for the VA type liquid crystal display element adopted herein is required to have large negative dielectric anisotropy, wide temperature range allowing the nematic phase expressed therein, and high chemical stability. As an example of the compound having negative dielectric anisotropy, German Patent No. DE3906058 describes a compound having a 2,3-difluorophenyl group. Recent trends in elevation in the driving frequency of the liquid crystal display device up to 120 Hz or above have raised the need for a liquid crystal material capable of rapidly responding to applied voltage. None of the conventional liquid crystal materials, however, have sufficiently large levels of dielectric anisotropy $\Delta \varepsilon$ necessary for rapid response, so that it has therefore been expected to develop a liquid crystal material having a larger negative dielectric anisotropy $\Delta \varepsilon$.

In order to increase the negative level of the dielectric anisotropy $\Delta \varepsilon$ of a rod-like organic compound, it is generally effective to design the molecule so as to have a dipole moment in the direction orthogonal to the longitudinal direction thereof. More specifically, a method widely adopted is such as substituting the molecule with a cyano group, or halogen atom, so as to express the dipole moment in the direction orthogonal to the longitudinal direction.

A large number of liquid crystal compounds having benzene rings substituted with fluorine atoms, such as those disclosed in German Patent No. DE3906058 have been known, but there are only a few reports on compounds having a ring structure other than benzene ring, wherein the ring structure is partially substituted. In particular, no compound having a bicyclo[2.2.2]octane skeleton, having its hydrogen atoms at the 2- and 3-positions with three or more fluorine atoms has been known.

SUMMARY OF THE INVENTION

It is therefore an object of the present invention to provide a novel fluorobicyclo[2.2.2]octane compound useful typically as a liquid crystal compound adoptable to the liquid crystal display element, a method of producing the same, and applications thereof.

[1] A liquid crystal composition comprising at least one compound having a fluorobicyclo[2.2.2]octane skeleton represented by formula (I) below:

(I)

wherein, Y represents a hydrogen atom or fluorine atom.

[2] The liquid crystal composition of [1], wherein the compound further comprises one cyclic linking group selected from cyclic hydrocarbon group and aromatic group.

[3] The liquid crystal composition of [1], wherein the compound is represented by formula (II) below:

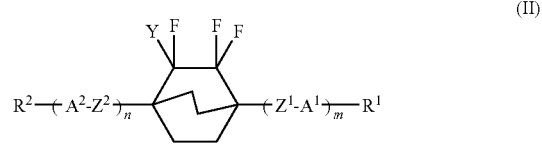

(II)

wherein, Y represents a hydrogen atom or fluorine atom; each of $R^1$ and $R^2$ independently represents a hydrogen atom, alkyl group having 1 to 12 carbon atoms, or alkenyl group having 2 to 12 carbon atoms, one $CH_2$ group or non-neighboring two or more $CH_2$ groups contained in these groups may be substituted by oxygen (O) atom(s) or sulfur (S) atom(s), and one or more hydrogen atoms contained in these groups may be substituted by fluorine atom(s) or chlorine atom(s); each of $A^1$ and $A^2$ independently represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH groups contained in this group may be substituted by nitrogen (N) atom(s), and, one or more hydrogen atoms contained in this group may be substituted by halogen atom(s) or CN), or, (d) 1,4-bicyclo[2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s), or bromine atom(s)); each of $Z^1$ and $Z^2$ independently represents —COO—, —OCO—, —$CH_2$O—, —O$CH_2$—, —$CF_2$O—, —O$CF_2$—, —$CF_2CF_2$—, —CF=CF—, —C≡C—, —CH=CH—, —$CH_2CH_2$—, or, single bond; each of m and n independently represents 0, 1 or 2, two ($A^1$)s, two ($A^2$)s, two ($Z^1$)s or two ($Z^2$)s for m=2 or n=2 may independently be same with, or different from each other.

[4] The compound of [3], wherein at least either one of $A^1$ and $A^2$ in formula (II) may be substituted by a trans-1,4-cyclohexylene group, or, a 1,4-phenylene group which may be substituted by one or more fluorine atom(s).

[5] A liquid crystal display device comprising:
two polarizing films disposed so that the absorption axes thereof are orthogonal to each other;
a liquid crystal cell comprising a pair of substrates, and liquid crystal layer held between the pair of substrates, and disposed between the two polarizer films, and
the liquid crystal layer comprises the liquid crystal composition described in any one of [1] to [4].

[6] The liquid crystal display device of [5], which employs a VA mode.

[7] A fluorobicyclo[2.2.2]octane compound represented by formula (II) below:

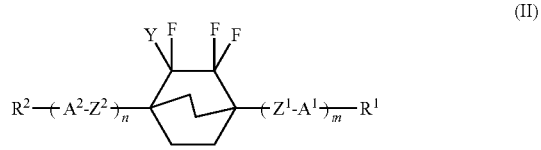

(II)

wherein, Y represents a hydrogen atom or fluorine atom; each of $R^1$ and $R^2$ independently represents a hydrogen atom, alkyl group having 1 to 12 carbon atoms, or alkenyl group having 2 to 12 carbon atoms, one $CH_2$ group or non-neighboring two or more $CH_2$ groups contained in these groups may be substituted by oxygen (O) atom(s) or sulfur (S) atom(s), and one or more hydrogen atoms contained in these groups may be substituted by fluorine atom(s) or chlorine atom(s); each of $A^1$ and $A^2$ independently represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH groups contained in this group may be substituted by nitrogen (N) atom(s), and, one or more hydrogen atoms contained in this group may be substituted by halogen atom(s) or CN), or, (d) 1,4-bicyclo[2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s), or bromine atom(s)); each of $Z^1$ and $Z^2$ independently represents —COO—, —OCO—, —$CH_2$O—, —O$CH_2$—, —$CF_2$O—, —O$CF_2$—, —$CF_2CF_2$—, —CF=CF—, —C≡C—, —CH=CH—, —$CH_2CH_2$—, or, single bond; each of m and n independently represents 0, 1 or 2, two ($A^1$)s, two ($A^2$)s, two ($Z^1$)s or two ($Z^2$)s for m=2 or n=2 may independently be same with, or different from each other.

[8] The fluorobicyclo[2.2.2]octane compound of [7], wherein at least either one of $A^1$ and $A^2$ in formula (II) may be substituted by a trans-1,4-cyclohexylene group, or, a 1,4-phenylene group which may be substituted by one or more fluorine atom(s).

[9] A fluorobicyclo[2.2.2]octane compound represented by formula (III) below:

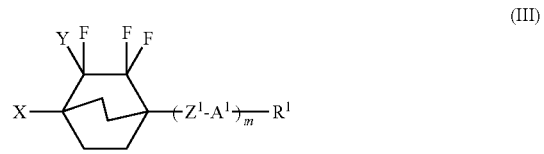

(III)

wherein, Y represents a hydrogen atom or fluorine atom; X represents a halogen atom or $OR^3$ ($R^3$ represents a hydrogen atom or protective group of hydroxyl group, or, a group which functions as an elimination group in a form of $OR^3$); $R^1$ represents a hydrogen atom, alkyl group having 1 to 12 carbon atoms, or alkenyl group having 2 to 12 carbon atoms, one $CH_2$ group or non-neighboring two or more $CH_2$ groups contained in these groups may be substituted by oxygen (O) atom(s) or sulfur (S) atom(s), one or more hydrogen atoms contained in these groups may be substituted by fluorine atom(s) or chlorine atom(s); $A^1$ represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH groups contained in this group may be substituted by nitrogen (N) atom(s), and, one or more hydrogen atoms contained in this group may be substituted by halogen atom(s) or CN), or, (d) 1,4-bicyclo[2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s), or bromine atom(s)); $Z^1$ represents —COO—, —OCO—, —$CH_2$O—, —O$CH_2$—, —$CF_2$O—, —O$CF_2$—, —$CF_2CF_2$—, —CF=CF—, —C≡C—, —CH=CH—, —$CH_2CH_2$—, or, single bond; and m represents 0, 1 or 2.

[10] The fluorobicyclo[2.2.2]octane compound of [9], wherein X represents a halogen atom, OH, $OSO_2R$, or OCOR (R represents an alkyl group having 1 to 12 carbon atoms, or phenyl group, one or more hydrogen atoms contained in these groups may be substituted by fluorine atom(s), chlorine atom(s), or alkyl group(s) having 1 to 12 carbon atoms).

[11] A method of producing a fluorobicyclo[2.2.2]octane compound having a fluorobicyclo[2.2.2]octane skeleton represented by formula (I) below:

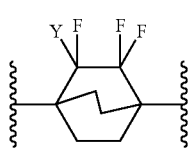
(I)

wherein, Y represents a hydrogen atom or fluorine atom;

comprising carrying out reaction of a compound, which has a fluorobicyclo[2.2.2]octene skeleton represented by formula (IV) below:

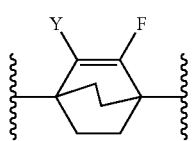
(IV)

wherein, Y represents a hydrogen atom or fluorine atom; with fluorine gas.

[12] A method of producing a fluorobicyclo[2.2.2]octane compound which is described in [7], comprising carrying out reaction of a fluorobicyclo[2.2.2] octene compound which is represented by formula (V) below:

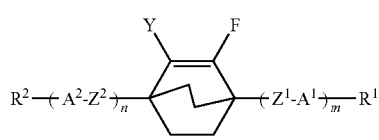
(V)

wherein, Y, $R^1$, $R^2$, $A^1$, $A^2$, $Z^1$, $Z^2$, m and n are equally defined as those in formula (II) described in [7];

with fluorine gas.

[13] A method of producing a fluorobicyclo[2.2.2]octane compound which is described in [9], comprising carrying out reaction of a fluorobicyclo[2.2.2] octene compound which is represented by formula (VI) below:

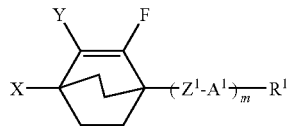
(VI)

wherein, X represents a halogen atom or $OR^3$ ($R^3$ represents a hydrogen atom or protective group of hydroxyl group, or, a group which functions as an elimination group in a form of $OR^3$), and Y, $R^1$, $A^1$, $Z^1$ and m are equally defined as those in formula (III) described in [9];

with fluorine gas.

DETAILED DESCRIPTION OF THE INVENTION

The invention is described in detail hereinunder. Note that, in this patent specification, any numerical expressions in a style of "numerical value 1 to numerical value 2" will be used to indicate a range including the lower and upper limits represented by the numeral values 1 and 2 given before and after "to", respectively.

The present invention relates to a compound having a fluorobicyclo[2.2.2] octane skeleton, more specifically a skeleton represented by formula (I) below; and a liquid crystal composition containing the same.

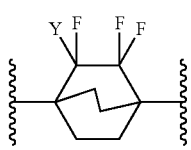
(I)

In the formula, Y represents a hydrogen atom or fluorine atom.

The compound having the skeleton represented by formula (I) according to the present invention (occasionally referred to as "fluorobicyclo[2.2.2]octane compound", hereinafter) may be a compound which intrinsically expresses liquid crystallinity by itself, or may be a compound which expresses liquid crystallinity in a form of compound obtained after being mixed with another, or two or more other compounds. In the description below, the term "compound for liquid crystal material" is used not only for a compound which intrinsically expresses liquid crystallinity alone by itself, and is usable as a liquid crystal compound independently or in a form of composition, but also for a compound which does not express liquid crystallinity alone by itself, but may be usable as a liquid crystal material after being mixed with other material.

Compound Represented by Formula (II)

The present invention relates to a compound represented by formula (II) below. The compound may be adoptable to various applications. The compound is particularly preferable as a compound for liquid crystal material.

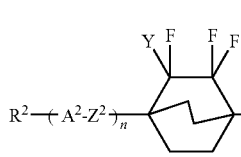
(II)

In formula (II), Y represents a hydrogen atom or fluorine atom; each of $R^1$ and $R^2$ independently represents a hydrogen atom, alkyl group having 1 to 12 carbon atoms, or alkenyl group having 2 to 12 carbon atoms, one $CH_2$ group or non-neighboring two or more $CH_2$ groups contained in these groups may be substituted by oxygen (O) atom(s) or sulfur (S) atom(s), and one or more hydrogen atoms contained in these groups may be substituted by fluorine atom(s) or chlorine atom(s); each of $A^1$ and $A^2$ independently represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH groups contained in this group may be substituted by nitrogen (N) atom(s), and, one or more hydrogen atoms contained in this group may be substituted by halogen atom(s) or CN), or, (d) 1,4-bicyclo[2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s), or bromine atom(s)); each of $Z^1$ and $Z^2$ independently represents —COO—, —OCO—, —$CH_2O$—, —$OCH_2$—, —$CF_2O$—, —$OCF_2$—, —$CF_2CF_2$—, —CF=CF—, —C≡C—, —CH=CH—, —$CH_2CH_2$—, or, single bond; each of m and n independently represents 0, 1 or 2, two ($A^1$)s, two ($A^2$)s, two ($Z^1$)s or two ($Z^2$)s for m=2 or n=2 may independently be same with, or different from each other.

In formula (II), each of $R^1$ and $R^2$ independently represents a hydrogen atom, alkyl group having 1 to 12 carbon atoms (preferably having 1 to 8 carbon atoms, and more preferably having 1 to 5 carbon atoms), or an alkenyl group having 2 to 12 carbon atoms (preferably having 2 to 8 carbon atoms, and more preferably having 2 to 5 carbon atoms), one $CH_2$ group or non-neighboring two or more $CH_2$ groups contained in these groups may be substituted by oxygen (O) atom(s) or sulfur (S) atom(s), and one or more hydrogen atoms contained in these groups may be substituted by fluorine atom(s) or chlorine atom(s). Examples of $R^1$ and $R^2$ include methyl, ethyl, n-propyl, n-butyl, n-pentyl, vinyl, trans-1-propenyl, 3-butenyl, trans-3-pentenyl, methoxy, ethoxy, n-propoxy, n-butoxy and allyloxy.

In formula (II), each of $A^1$ and $A^2$ independently represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH group contained in this group may be substituted by nitrogen atom(s) (N), and, one or more hydrogen atoms contained in this group may be substituted by halogen atom(s) or CN), or, (d) 1,4-bicyclo[2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s), or bromine atom(s)), and preferably represents a trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), 1,4-phenylene group (one or more CH groups contained in this group may be substituted by N, and, one or more hydrogen atoms contained in this group may be substituted by halogen atom(s) or CN). More specifically, each of $A^1$ and $A^2$ independently represents a trans-1,4-cyclohexylene group, or, a 1,4-phenylene group which may be substituted by one or more fluorine atoms, and at least either $A^1$ or $A^2$ (preferably $A^2$) represents a trans-1,4-cyclohexylene group, or, a 1,4-phenylene group which may be substituted by one or more fluorine atoms.

In formula (II), each of $Z^1$ and $Z^2$ independently represents —COO—, —OCO—, —$CH_2O$—, —$OCH_2$—, —$CF_2O$—, —$OCF_2$—, —$CF_2CF_2$—, —CF=CF—, —C≡C—, —CH=CH—, —$CH_2CH_2$—, or single bond; preferably represents —COO—, —OCO—, —$CH_2O$—, —$OCH_2$—, —$CF_2O$—, —$OCF_2$—, —C≡C—, —$CH_2CH_2$—, or, single bond, more preferably represents —COO—, —OCO—, —$CH_2O$—, —$OCH_2$—, —$CH_2CH_2$—, or single bond; and still more preferably represents —$CH_2O$—, —$OCH_2$—, —$CH_2CH_2$—, or single bond.

In formula (II), each of m and n independently represents 0, 1 or 2, and more preferably represents 1 or 2. Examples of the compound represented by formula (II) also includes those having 0 for m, and 1 or 2 for n. Such compound may be represented by formula (II)'.

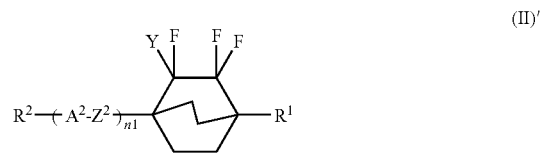

In the formula, n1 represents 1 or 2. Other symbols are defined similarly to those in formula (II), and are therefore represented by similar preferable examples.

As described in the above, the compound represented by formula (II) is one preferable example, as a compound for liquid crystal material, of the compound having the fluorobicyclo[2.2.2]octane skeleton represented by formula (I). Examples of the compound represented by formula (II) include various compounds producible by combining $R^1$, $R^2$, $A^1$, $A^2$, $Z^1$, $Z^2$, m and n. Preferable examples are listed below, without limiting the present invention.

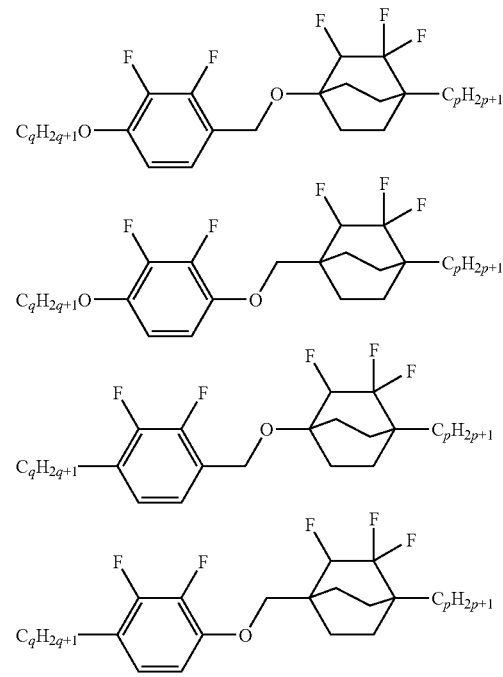

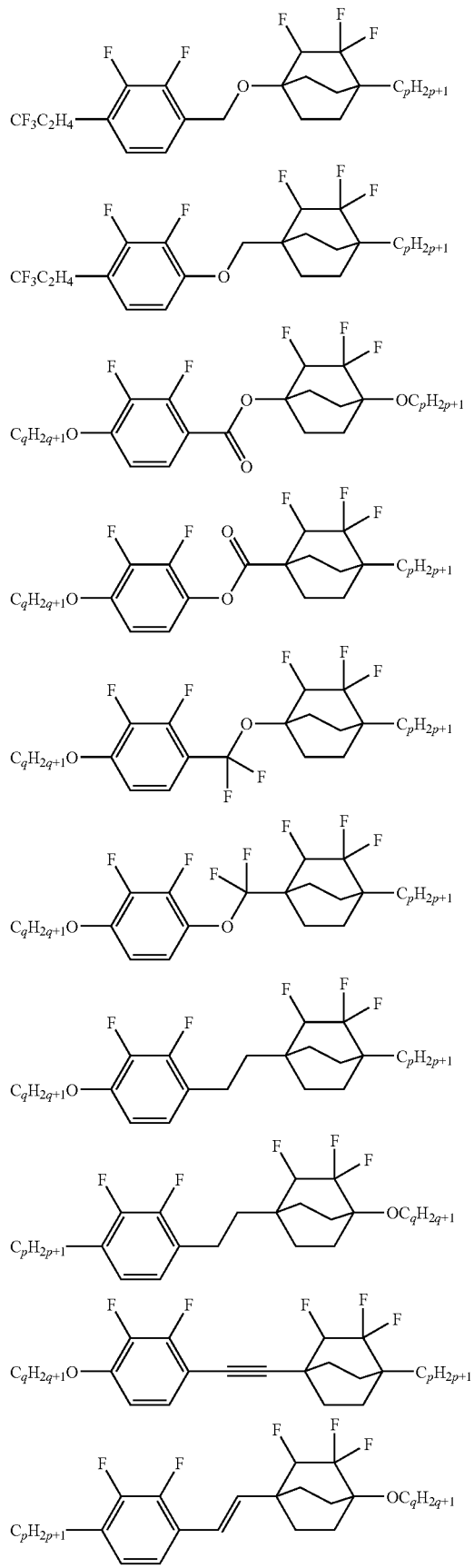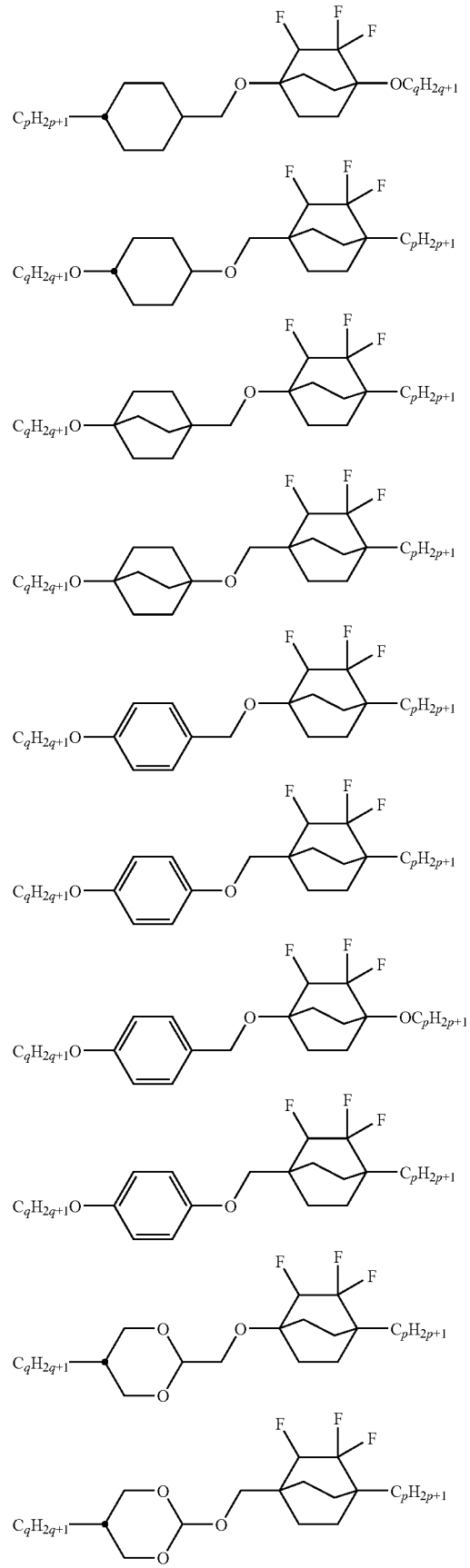

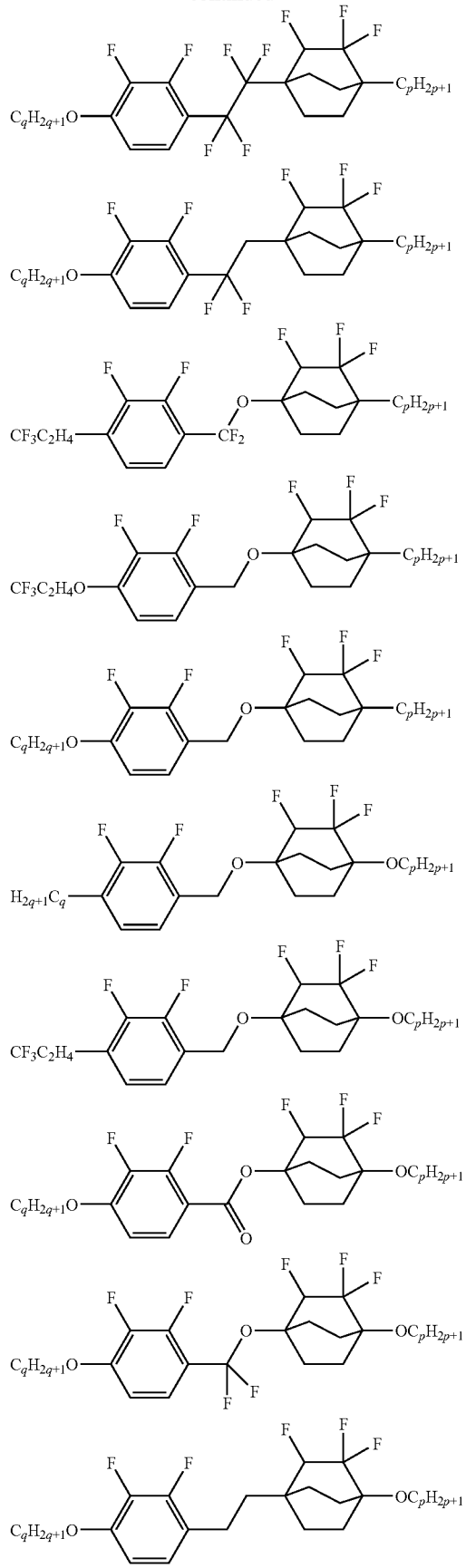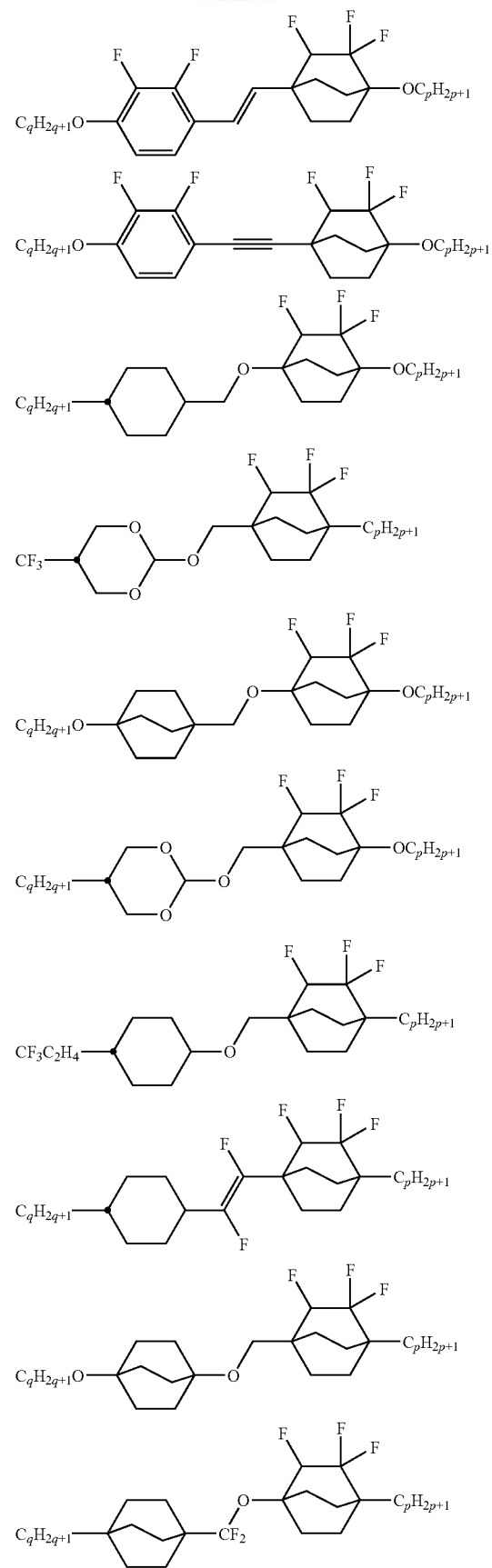

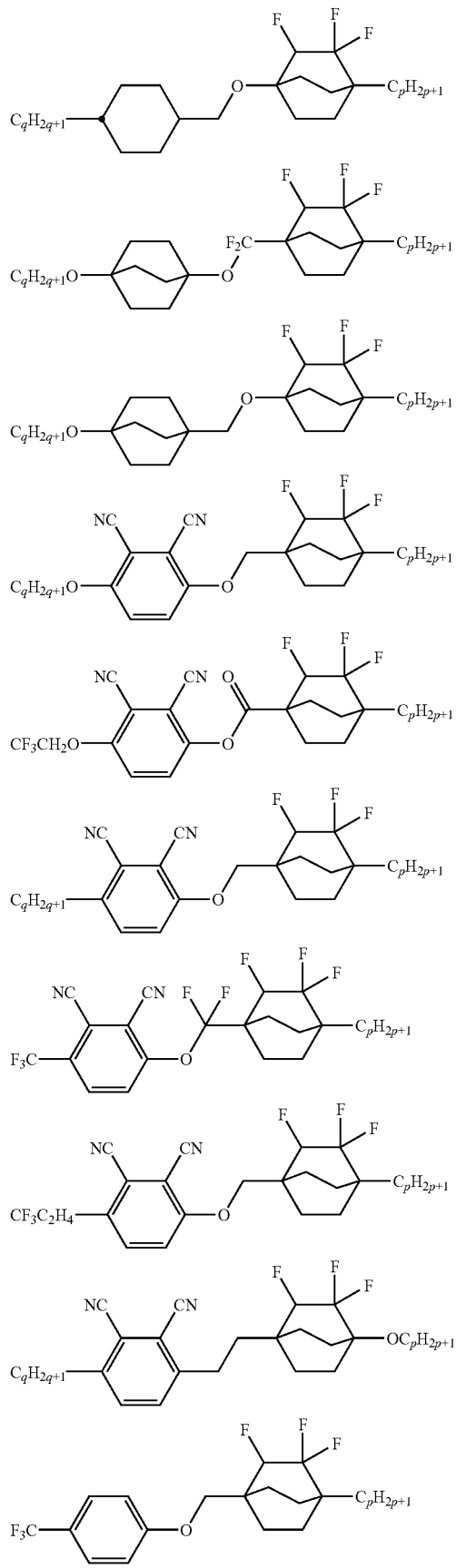
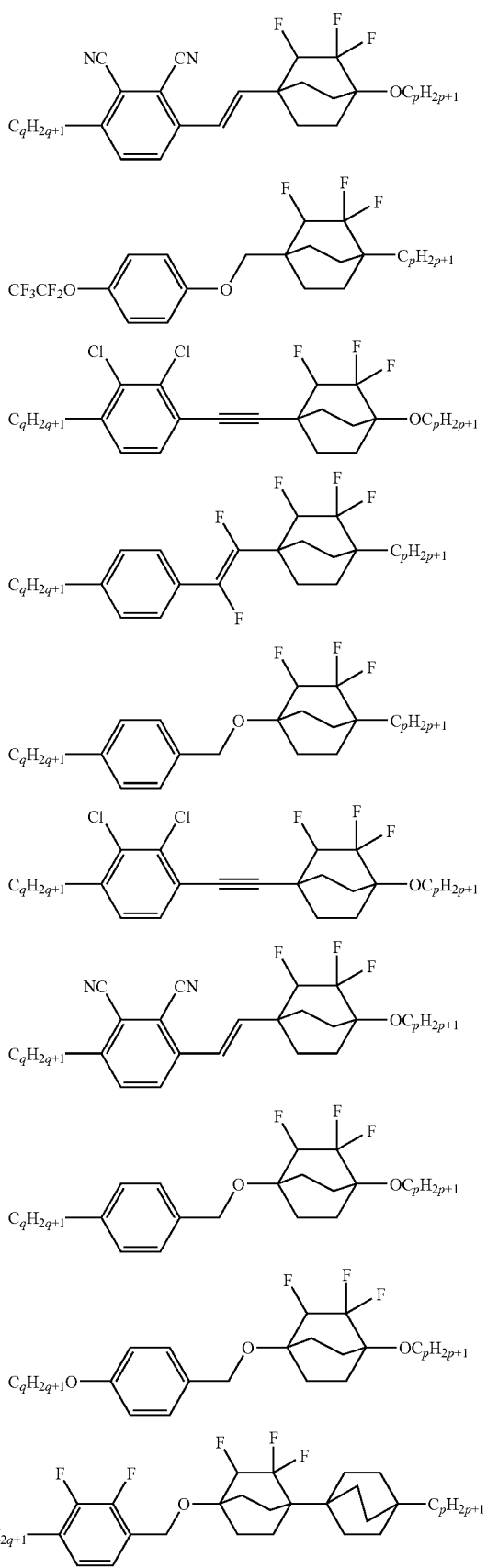

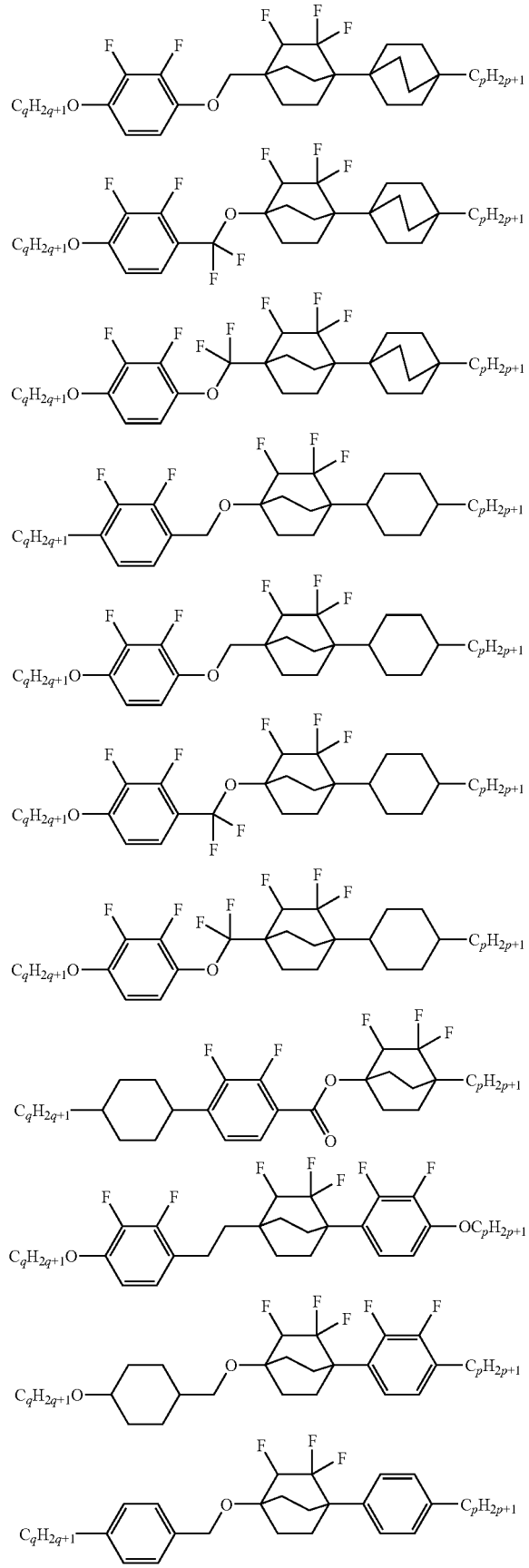
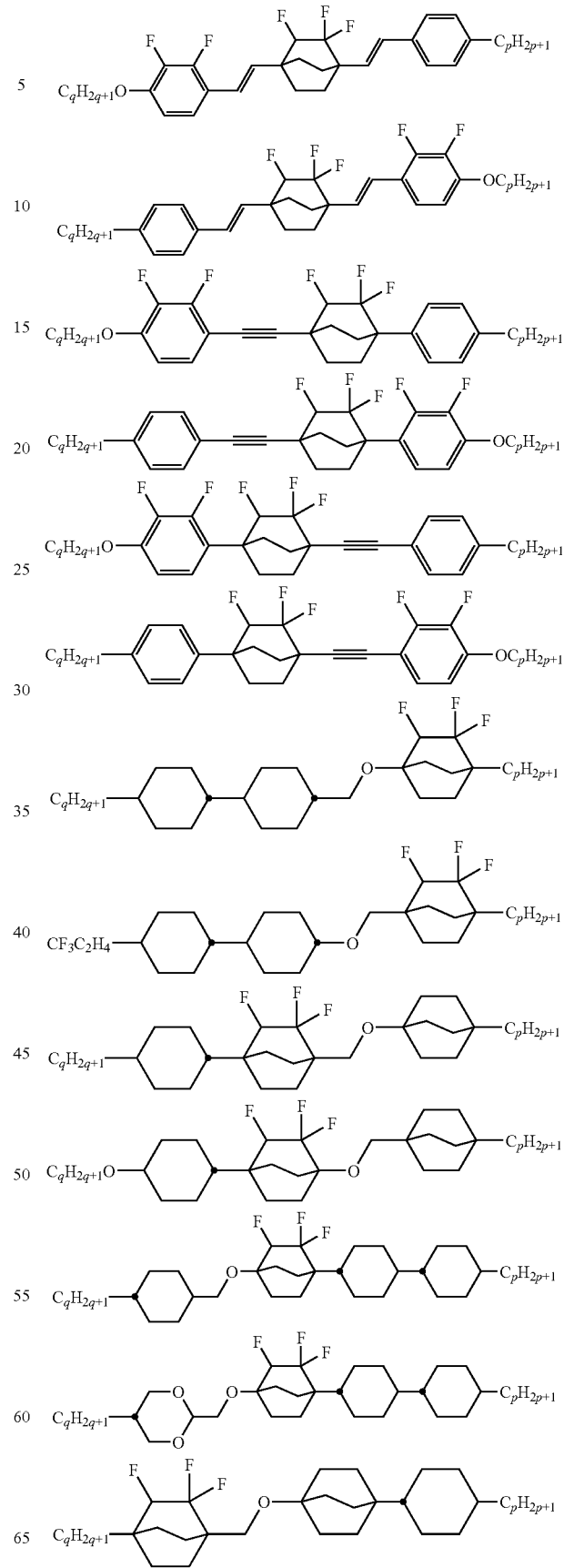

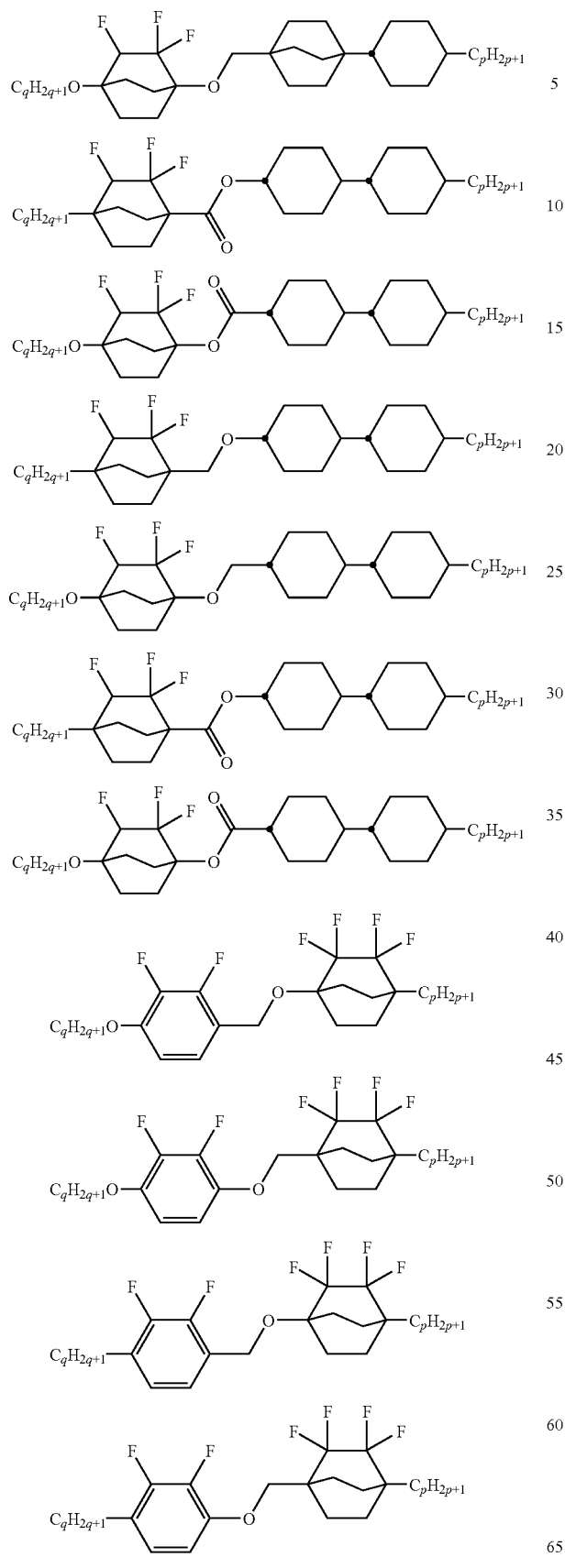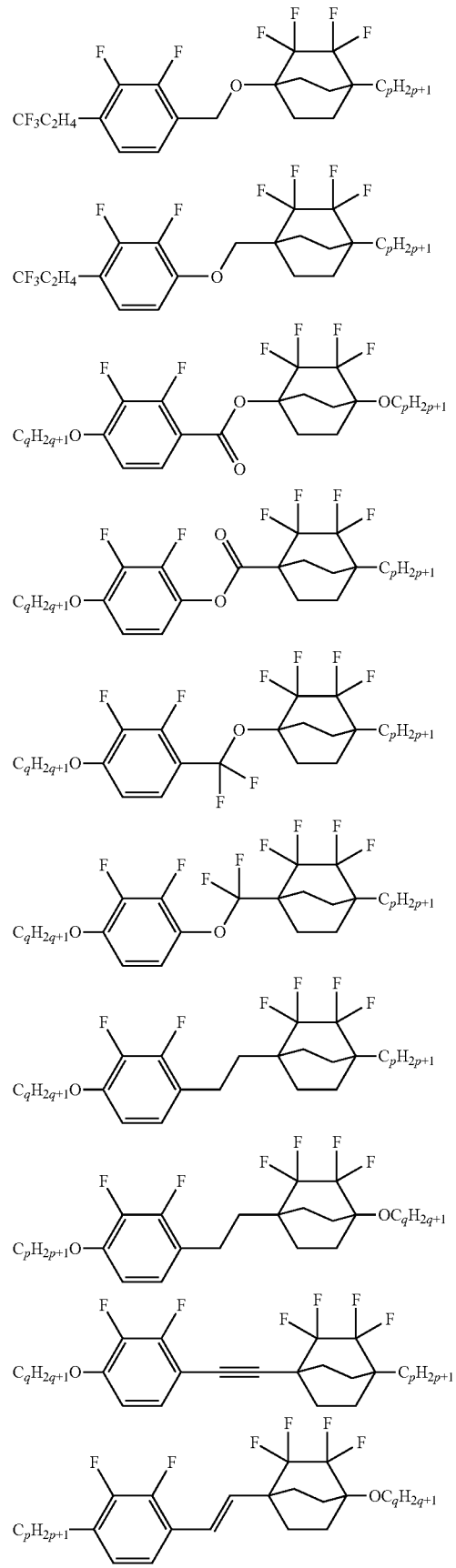

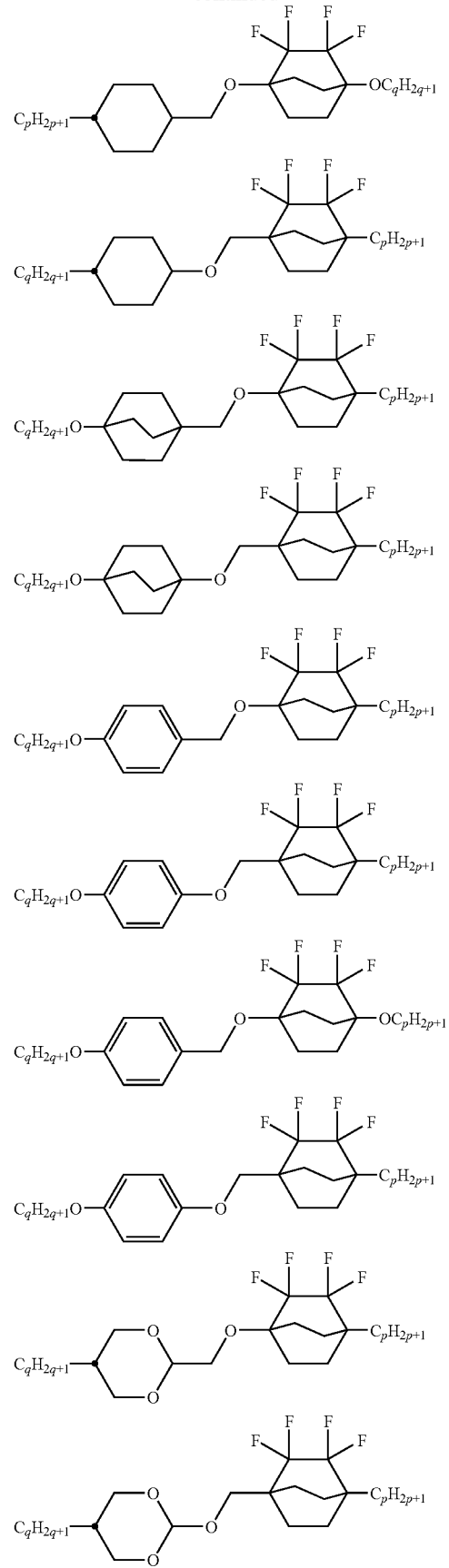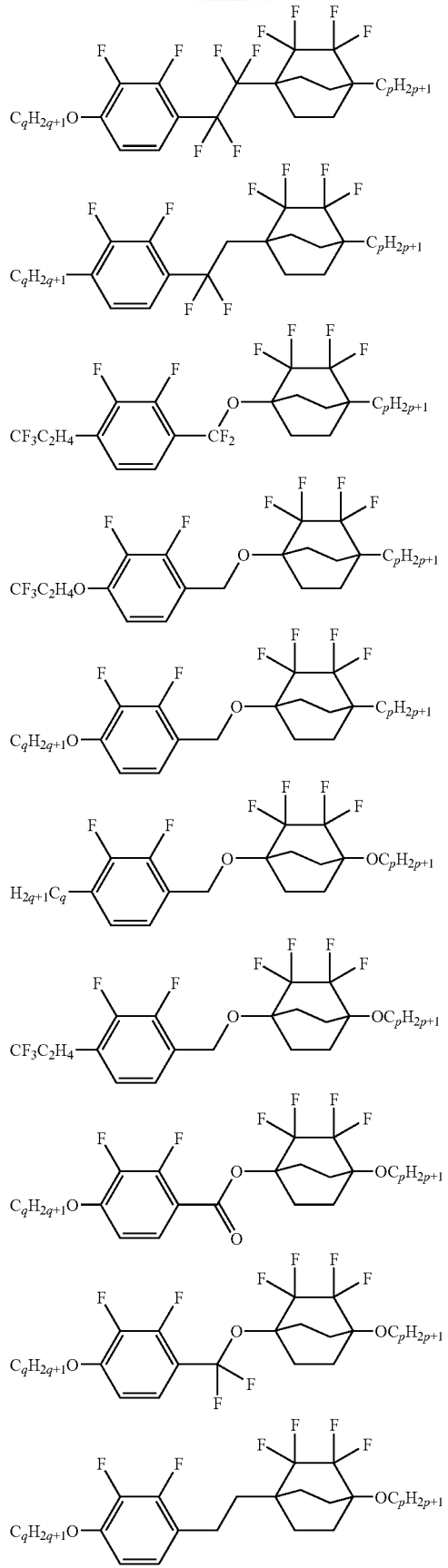

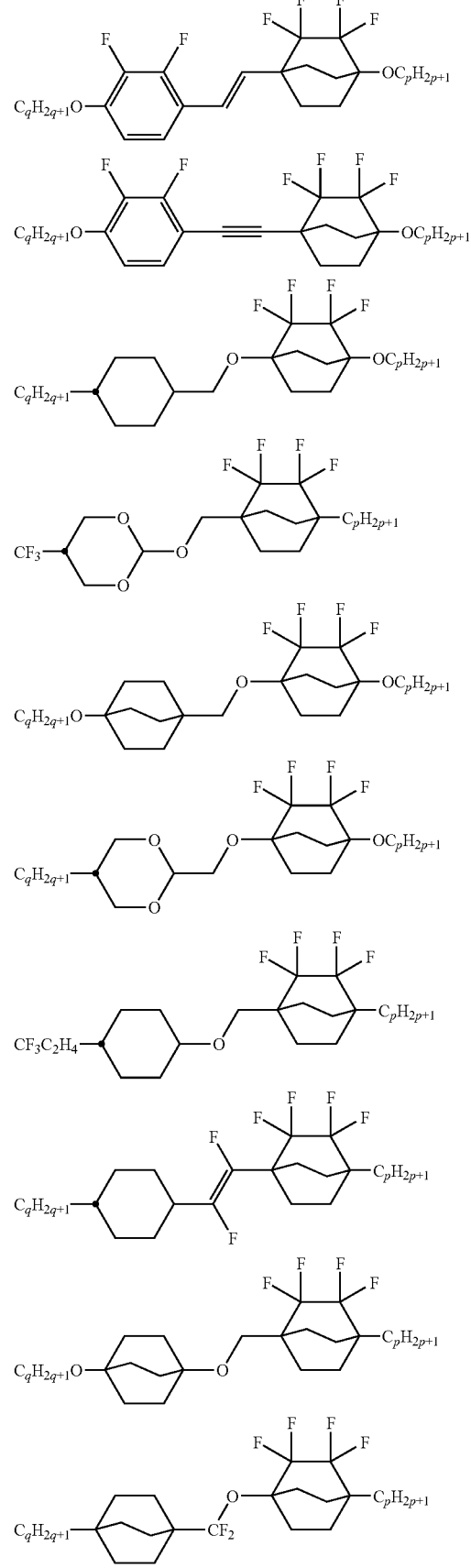
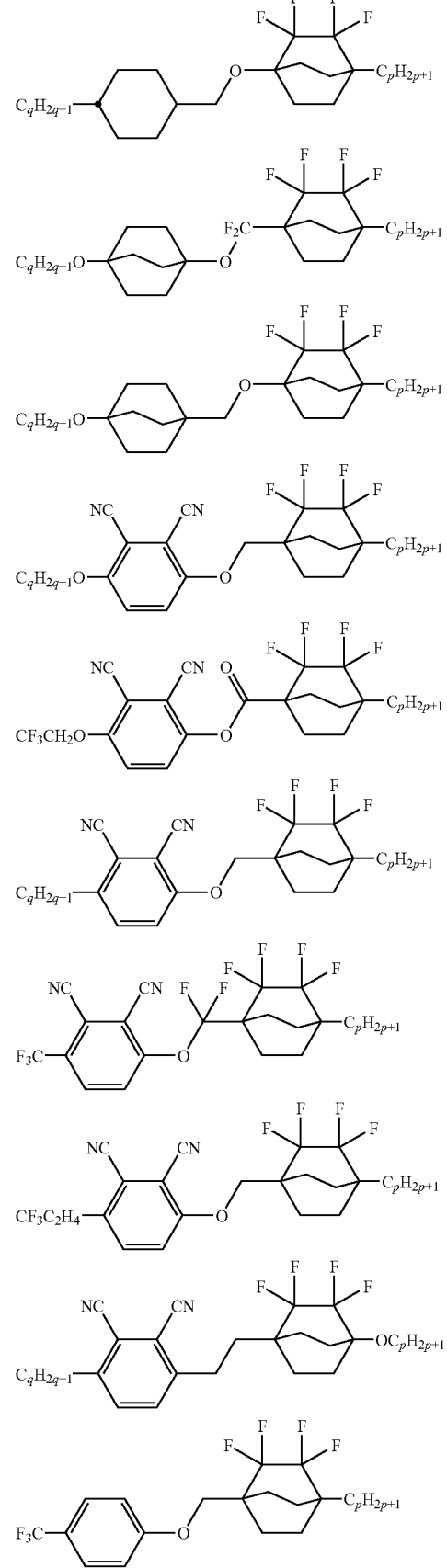

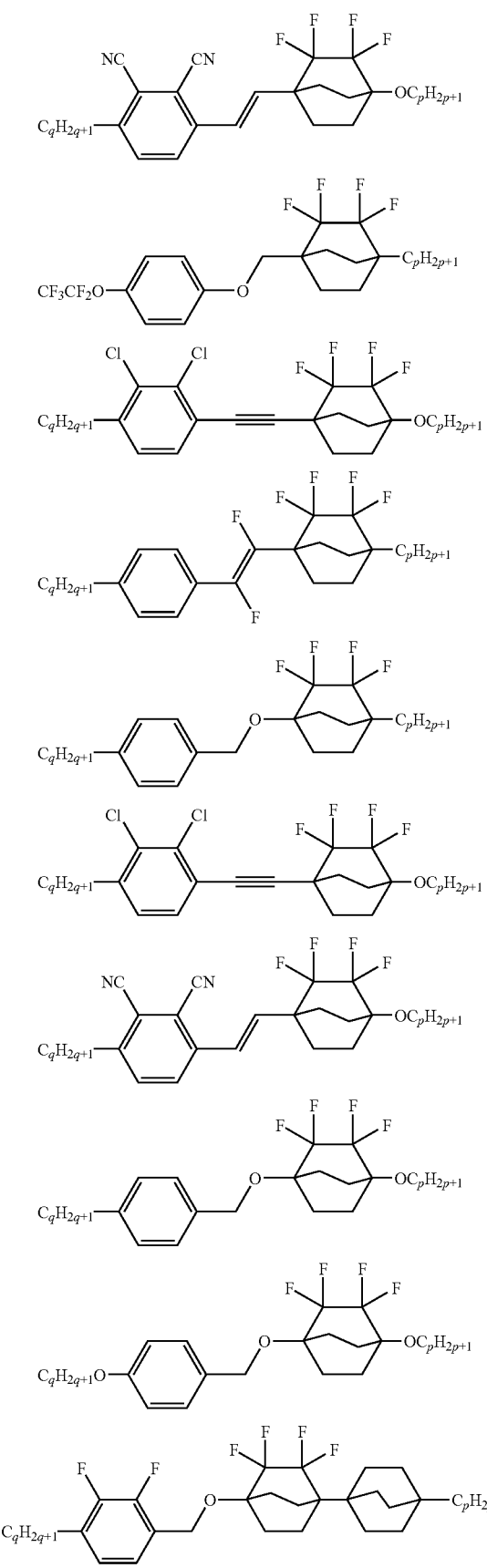
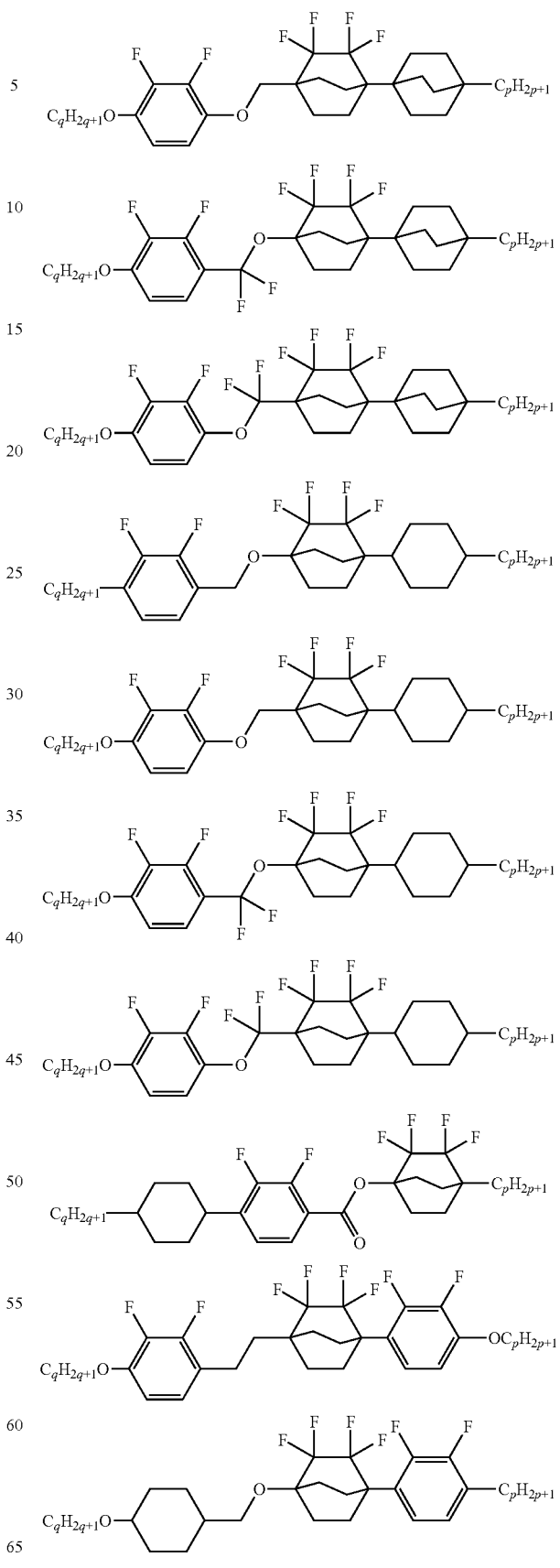

-continued

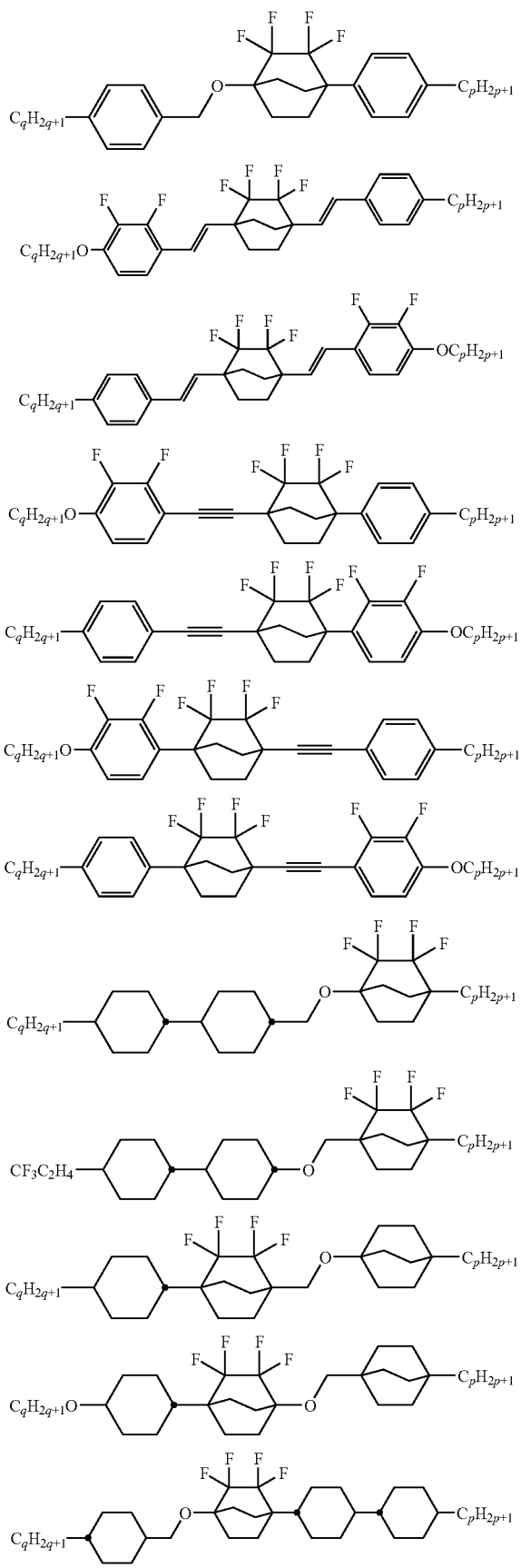

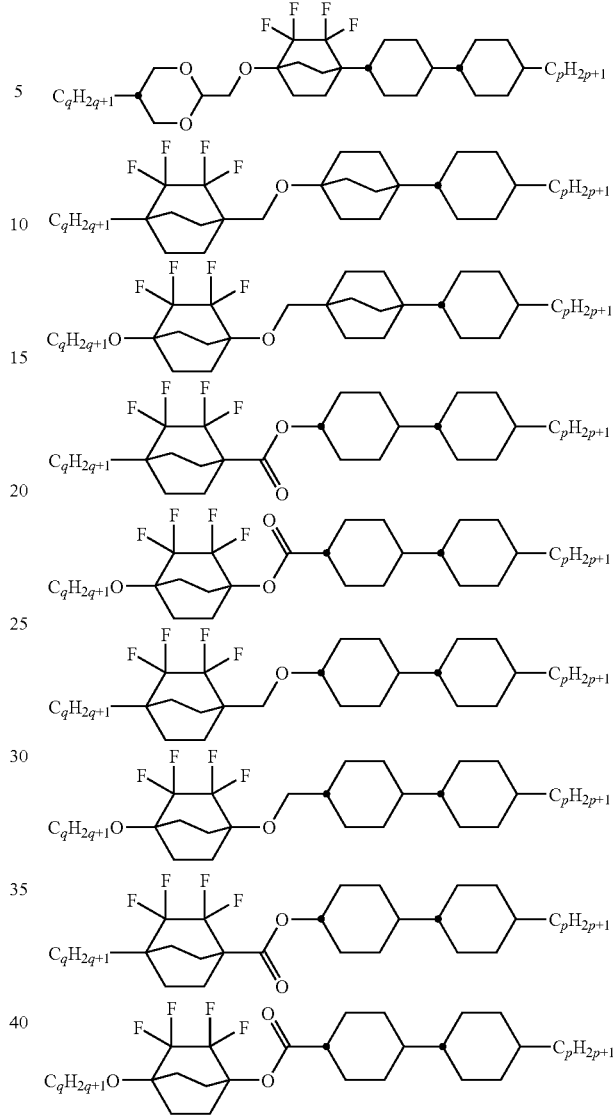

Each of p and q independently represents an integer from 1 to 9. Each of the groups represented by $C_pH_{2p+1}$ and $C_qH_{2q+1}$ is preferably a straight-chain group, and may have one or more hydrogen atoms thereof substituted by fluorine atom(s). Abbreviation Ac found in the formulae represents acetyl group, MOM represents methoxymethyl group, Ts represents tosyl group, THP represents tetrahydropyranyl group, Ms represents methanesulfonyl group, Tf represents trifluoromethane sulfonyl group, TMS represents trimethylsilyl group, Bn represents benzyl group, Bz represents benzoyl group, and Ph represents phenyl group.

Compound Represented by Formula (III)

The present invention also relates to the fluorobicyclo [2.2.2]octane compound represented by formula (III). The compound may be adoptable to various applications. The compound is particularly preferable as an intermediate of the compound for liquid crystal material. The intermediate of the compound for liquid crystal material herein means a compound convertible to other compound for liquid crystal material by one or more steps. The intermediate may intrinsically express liquid crystallinity, and may be adoptable as a liquid crystal material alone by itself or in a form of composition, or the intermediate may not necessarily express liquid crystallinity, but may be adoptable as a liquid crystal material after being mixed with other material.

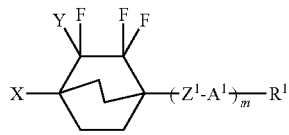

(III)

In formula (III), Y represents a hydrogen atom or fluorine atom; X represents a halogen atom or OR³ (R³ represents a hydrogen atom or protective group of hydroxyl group, or, a group which functions as an elimination group in a form of OR³); R¹ represents a hydrogen atom, alkyl group having 1 to 12 carbon atoms, or alkenyl group having 2 to 12 carbon atoms, one $CH_2$ group or non-neighboring two or more $CH_2$ groups contained in these groups may be substituted by oxygen (O) atom(s) or sulfur (S) atom(s), one or more hydrogen atoms contained in these groups may be substituted by fluorine atom(s) or chlorine atom(s); A¹ represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atoms) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH groups contained in this group may be substituted by nitrogen (N) atom(s), and, one or more hydrogen atoms contained in this group may be substituted by halogen atoms) or CN), or, (d) 1,4-bicyclo[2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s); or bromine atom(s)); $Z^1$ represents —COO—, —OCO—, —$CH_2O$—, —$OCH_2$—, —$CF_2O$—, —$OCF_2$—, —$CF_2CF_2$—, —CF=CF—, —C≡C—, —CH=CH—, —$CH_2CH_2$—, or, single bond; and m represents 0, 1 or 2.

In formula (III), R¹ represents a hydrogen atom, alkyl group having 1 to 12 carbon atoms (preferably having 1 to 8 carbon atoms, and more preferably having 1 to 5 carbon atoms), or alkenyl group having 2 to 12 carbon atoms (preferably having 2 to 8 carbon atoms, and more preferably having 2 to 5 carbon atoms), one $CH_2$ group or non-neighboring two or more $CH_2$ groups contained in these groups may be substituted by oxygen (O) atom(s) or sulfur (S) atom(s), and one or more hydrogen atoms contained in these groups may be substituted by fluorine atom(s) or chlorine atom(s). Examples of R¹ include methyl, ethyl, n-propyl, n-butyl, n-pentyl, vinyl, trans-1-propenyl, 3-butenyl, trans-3-pentenyl, methoxy, ethoxy, n-propoxy, n-butoxy and allyloxy.

In formula (III), A¹ represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atoms) or CN), (c) 1,4-phenylene group (one or more CH groups contained in this group may be substituted by nitrogen atom(s) (N), and, one or more hydrogen atoms contained in this group may be substituted by halogen atom(s) or CN), or, (d) 1,4-bicyclo [2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s), or bromine atom(s))), and preferably represents trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by a halogen atom(s) or CN), 1,4-phenylene group (one or more CH groups contained in this group may be substituted by N, and, one or more hydrogen atoms contained in this group may be substituted by halogen atoms(s) or CN), and more preferably represents trans-1,4-cyclohexylene group, or, 1,4-phenylene group which may be substituted by one or more fluorine atom(s).

In formula (III), $Z^1$ represents —COO—, —OCO—, —$CH_2O$—, —$OCH_2$—, —$CF_2O$—, —$OCF_2$—, —$CF_2CF_2$—, —CF=CF—, —C≡C—, —CH=CH—, —$CH_2CH_2$—, or, single bond, preferably represents —COO—, —OCO—, —$CH_2O$—, —$OCH_2$—, —$CF_2O$—, —$OCF_2$—, —C≡C—, —$CH_2CH_2$—, or, single bond, more preferably represents —COO—, —OCO—, —$CH_2O$—, —$OCH_2$—, —$CH_2CH_2$—, or, single bond, and still more preferably represents —$CH_2O$—, —$OCH_2$—, —$CH_2CH_2$—, or, single bond.

In formula (III), X represents a monovalent substituent, preferably represents a bromine atom, chlorine atom, or OR³. R³ represents a hydrogen atom or monovalent substituent. If R³ represents a monovalent substituent, it may preferably be a protective group of hydroxyl group, or, a group which functions as an elimination group in a form of OR³.

Examples of R³ include alkyls, substituted alkyls such as alkoxyalkyls, allyls, phenyl, substituted phenyls, benzyl, substituted benzyls, picolyl, 1,3-benzo dithiolane-2-yl, substituted silyls, formyl, substituted formyls, alkylcarbonyls, substituted alkylcarbonyls, phenylcarbonyls, substituted phenylcarbonyls, alkyloxycarbonyls, substituted alkyloxycarbonyls, phenyloxycarbonyl, substituted phenyloxycarbonyls, benzyloxycarbonyl, substituted benzyloxycarbonyls, substituted alkanoyloxys, substituted banzoyloxys, alkoxycarbonyls, alkylsulfinyls, arylsulfinyls, alkylsulfonyls, and arylsulfonyls. The number of carbon atoms in each of these groups is not limited to any range, and generally, the number of carbon atoms in any known group, which functions as a protective group of hydroxyl group or an elimination group in a form of OR³, is about 1-4.

Examples of the monovalent group represented by R³ include methyl, methoxymethyl, methylthiomethyl, tert-butylthiomethyl, (phenyldimethylsilyl)methoxymethyl, benzyloxymethyl, p-methoxy benzyloxy methyl, (p-methoxyphenoxy)methyl, (p-methoxy phenoxy)methyl, (o-methoxyphenoxy)methyl, tert-butoxymethyl, 4-pentenyloxymethyl, (tert-butyl dimethyl silyloxy)methyl, (tert-butyldiphenylsilyloxy)methyl, methoxyethoxymethyl, 2,2,2-trichloro ethoxymethyl, bis(2-chloroethoxy)methyl, 2-(trimethylsilyl)ethoxymethyl, tetrahydro pyranyl, 3-bromo tetrahydro pyranyl, tetrahydro thiopyranyl, 1-methoxy cyclohexyl, 4-methoxy tetrahydro pyranyl, 4-methoxy tetrahydro thiopyranyl, 1,4-dioxane-2-yl, tetrahydro furanyl, tetrahydro thiofuranyl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilyl ethyl, tert-butyl, allyl, p-chlorophenyl, p-methoxyphenyl, 2,4-dinitrophenyl, benzyl, p-methoxybenzyl, 3,4-dimethoxybenzyl, o-nitrobenzyl, p-nitrobenzyl, p-chlorobenzyl, p-bromobenzyl, 2,6-dichlorobenzyl, p-cyanobenzyl, p-phenylbenzyl, 2-picolyl, 4-picolyl, diphenylmethyl, bis(p-nitrophenyl)methyl, triphenylmethyl, p-methoxyphenyl diphenylmethyl, di(p-methoxyphenyl) phenylmethyl, tri(p-methoxyphenyl)methyl, 9-anthryl, 9-(9-phenyl)xanthenyl, 9-(9-phenyl-10-oxo) anthryl, 1,3-benzodithiolane-2-yl, trimethylsilyl, triethylsilyl, triisopropylsilyl, dimethylisopropylsilyl, (2,3-dimethyl-2-butyl)dimethylsilyl, tert-butyldimethylsilyl, tert-butyldiphenylsilyl, tribenzylsilyl, tri-p-xylylsilyl, triphenylsilyl, diphenylmethylsilyl, formyl, benzoylformyl, acetyl, chloroacetyl, dichloroacetyl, trichloroacetyl, trifluoroacetyl, methoxyacetyl, triphenylmethoxyacetyl, phenoxyacetyl, p-chlorophenoxyacetyl, propionyl, 3-phenylpropionyl, butanoyl, pentanoyl, 4-oxopentanoyl, 4,4-(ethylenedithio)pentanoyl, pivaloyl, hexanoyl, heptanoyl, octanoyl, 2-butenoyl, 4-methoxy-2-butenoyl, benzoyl, p-phenylbenzoyl, 2,4,6-trimethyl benzoyl, methyloxycarbonyl, 9-fluorenyl methyloxycarbonyl, ethyloxycarbonyl, 2,2,2-trichloroethyloxy carbonyl, 2-(trimethylsilyl)ethyloxy carbonyl, 2-(phenylsulfonyl)ethyloxy carbonyl, 2-(triphenyl phosphonio)ethyloxy carbonyl, isobutyloxy carbonyl, vinyloxy carbonyl, allyloxy carbonyl, p-nitrophenyloxy carbonyl, benzyloxy carbonyl, p-methoxybenzyloxy carbonyl, 3,4-dimethoxy benzyloxy carbonyl, o-nitro benzyloxy carbonyl, p-nitro benzyloxy carbonyl, methane sulfonyl, para-toluene sulfonyl, benzene sulfonyl, trifluoromethane sulfonyl and chloromethane sulfonyl. Preferable examples of the monovalent group represented by $R^3$ include methyl, methoxymethyl, benzyloxymethyl, p-methoxybenzyloxymethyl, (p-methoxyphenoxy)methyl, (o-methoxyphenoxy)methyl, tert-butoxymethyl, (tert-butyldimethylsilyloxy)methyl, (tert-butyldiphenylsilyloxy)methyl, methoxyethoxy methyl, 1-methoxy cyclohexyl, tetrahydro furanyl, 1-ethoxyethyl, 1-(2-chloroethoxy)ethyl, 1-methyl-1-benzyloxy ethyl, 2,2,2-trichloroethyl, 2-trimethylsilyl ethyl, tert-butyl, allyl, p-methoxyphenyl, benzyl, diphenylmethyl, bis(p-nitrophenyl)methyl, triphenylmethyl, triethylsilyl, triisopropyl silyl, tert-butyldimethylsilyl, tert-butyldiphenylsilyl, acetyl, phenoxyacetyl, p-chlorophenoxy acetyl, propionyl, 3-phenyl propionyl, butanoyl, pentanoyl, pivaloyl, benzoyl, benzyloxy carbonyl, p-methoxybenzyloxy carbonyl, methane sulfonyl, para-toluene sulfonyl, trifluoro methane sulfonyl and chloromethane sulfonyl; more preferable examples of the monovalent group represented by $R^3$ include methyl, methoxymethyl, benzyloxymethyl, 1-methoxy cyclohexyl, tetrahydro furanyl, 1-ethoxyethyl, 2-trimethylsilylethyl, tert-butyl, allyl, p-methoxy phenyl, benzyl, diphenyl methyl, triisopropylsilyl, tert-butyldimethylsilyl, tert-butyldiphenylsilyl, acetyl, phenoxyacetyl, propionyl, butanoyl, pentanoyl, benzoyl, p-methoxybenzyloxy carbonyl, methane sulfonyl, para-toluene sulfonyl, trifluoromethane sulfonyl and chloromethane sulfonyl; and even more preferable examples of the monovalent group represented by $R^3$ include methyl, methoxymethyl, benzyloxymethyl, tert-butyl, allyl, benzyl, triisopropylsilyl, tert-butyldimethylsilyl, acetyl, propionyl, benzoyl, methane sulfonyl, para-toluene sulfonyl, trifluoromethane sulfonyl and chloromethane sulfonyl.

In formula (III), m represents 0, 1 or 2, and preferably represents 1 or 2.

Examples of the compounds represented by formula (III) include various compounds producible by combining $R^1$, $A^1$, $Z^1$, X and m. Preferable examples are listed below, without limiting the present invention.

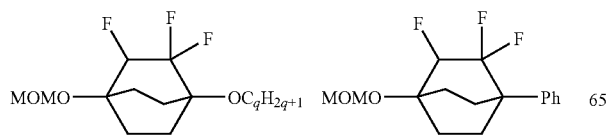

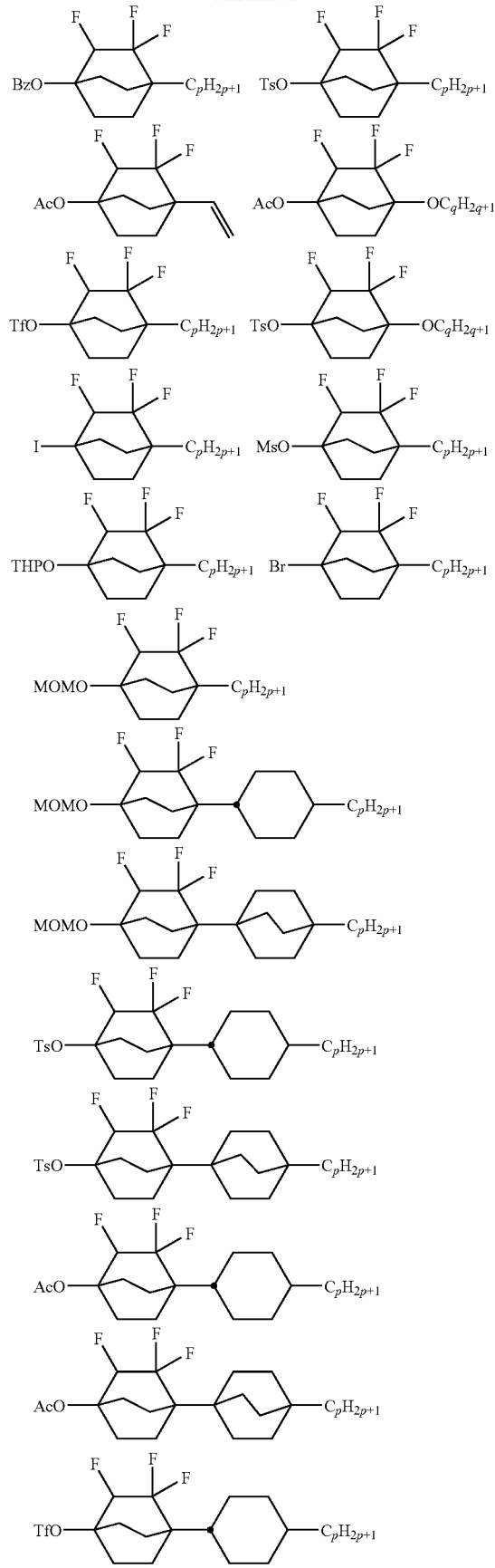

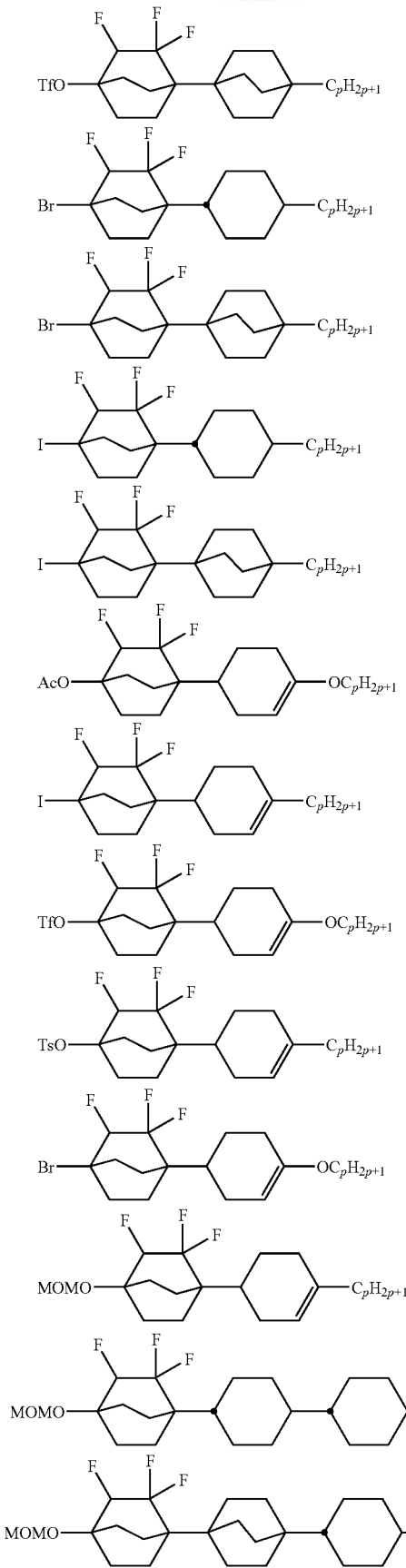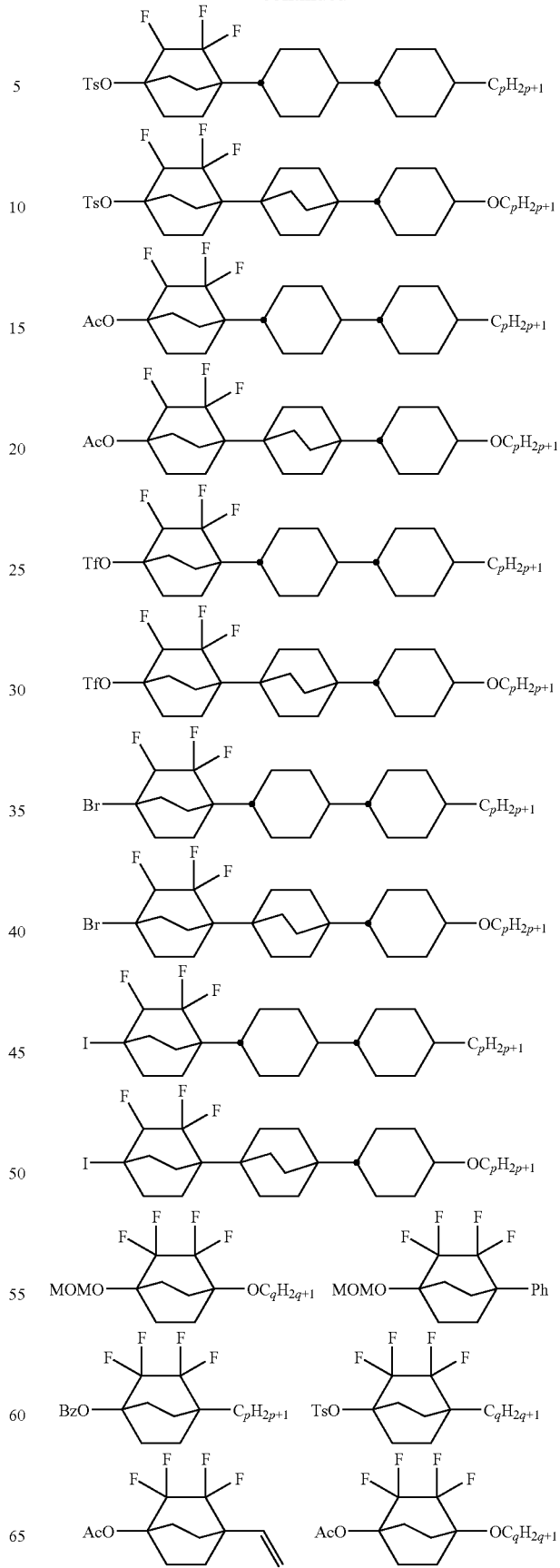

-continued
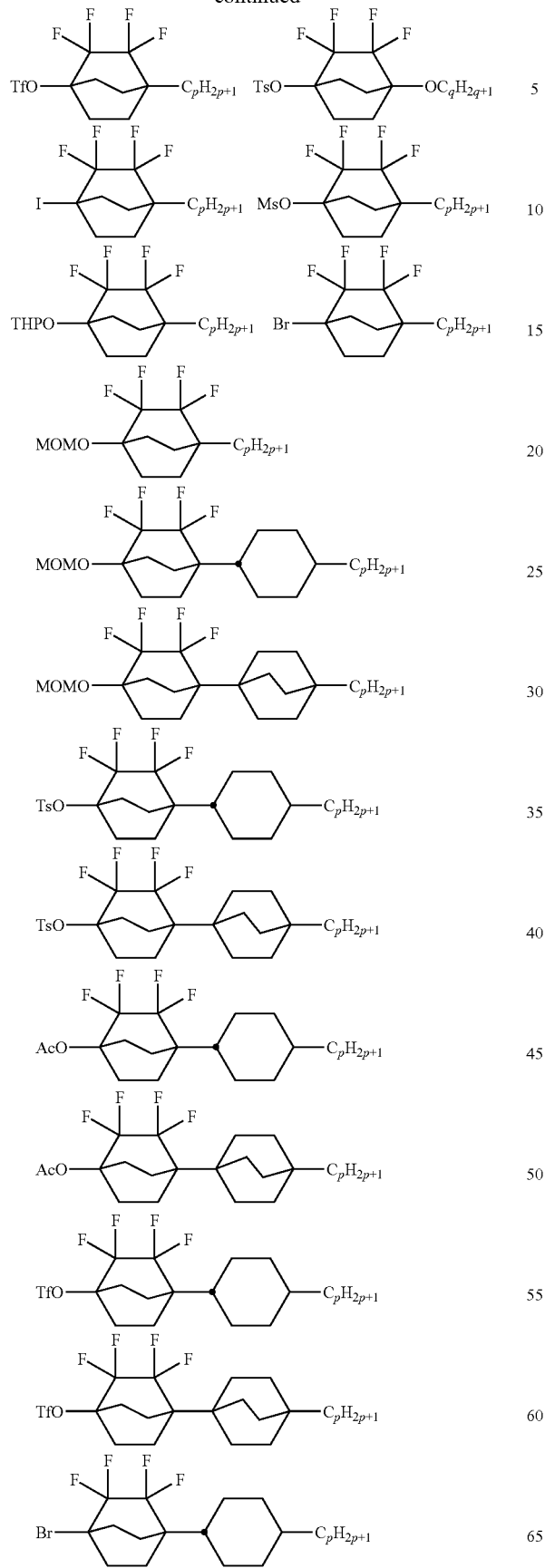
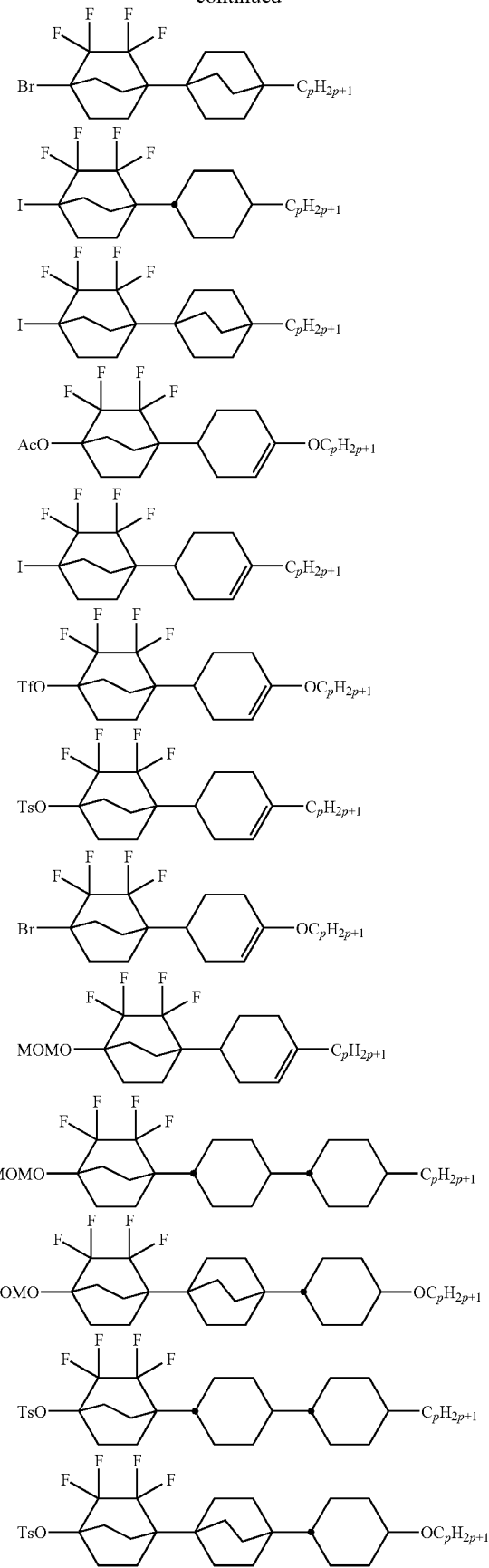

-continued

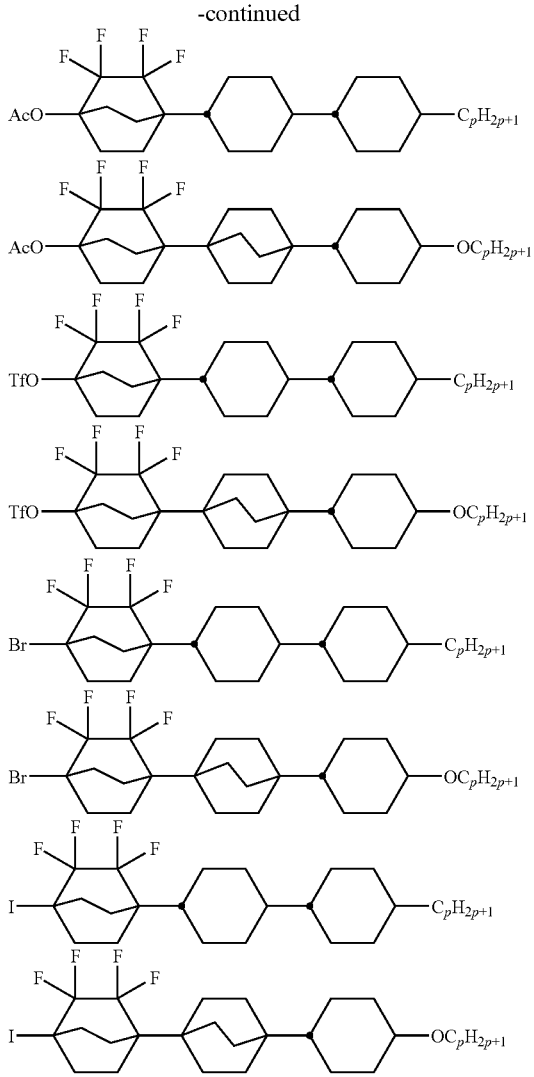

Each of p and q independently represents an integer from 1 to 9. Each of the groups represented by $C_pH_{2p+1}$ and $C_qH_{2q+1}$ is preferably a straight-chain group, and may have one or more hydrogen atoms thereof substituted by fluorine atom(s). Abbreviation Ac found in the formulae represents acetyl group, MOM represents methoxymethyl group, Ts represents tosyl group, THP represents tetrahydropyranyl group, Ms represents methanesulfonyl group, Tf represents trifluoromethane sulfonyl group, TMS represents trimethylsilyl group, Bn represents benzyl group, Bz represents benzoyl group, and Ph represents phenyl group.

An example of the method of producing the compound, having the fluorobicyclo[2.2.2]octane skeleton represented by formula (I), includes a step of allowing the compound, having the fluorobicyclo[2.2.2]octene skeleton represented by formula (IV), to react with fluorine gas.

(IV)

In the formula, Y represents a hydrogen atom or fluorine atom.

Method of Producing Compound Represented by Formula (II)

An example of the method of producing the compound represented by formula (II) includes a step of allowing the fluorobicyclo[2.2.2]octene compound represented by formula (V) to react with fluorine gas.

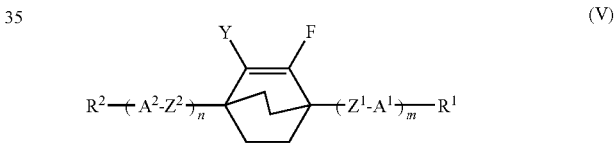

(V)

In the formula, Y, $R^1$, $R^2$, $A^1$, $A^2$, $Z^1$, $Z^2$, m and n are defined similarly to those in formula (II), and are therefore represented by similar preferable ranges.

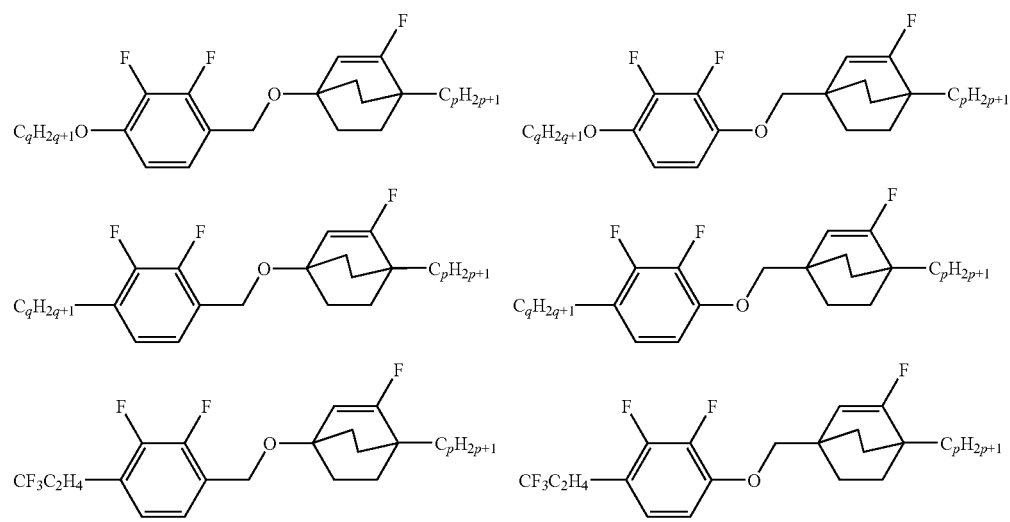

-continued
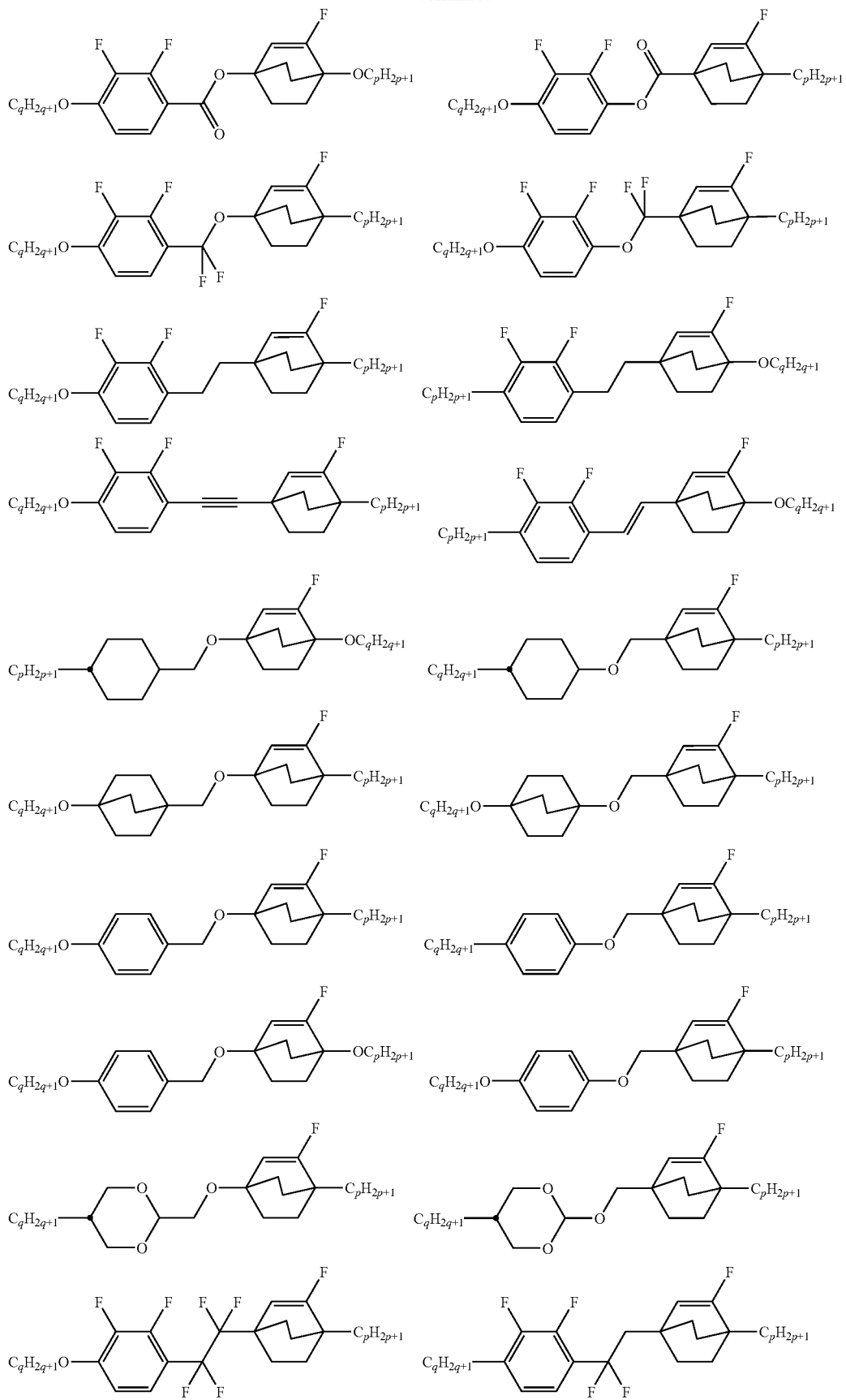

-continued
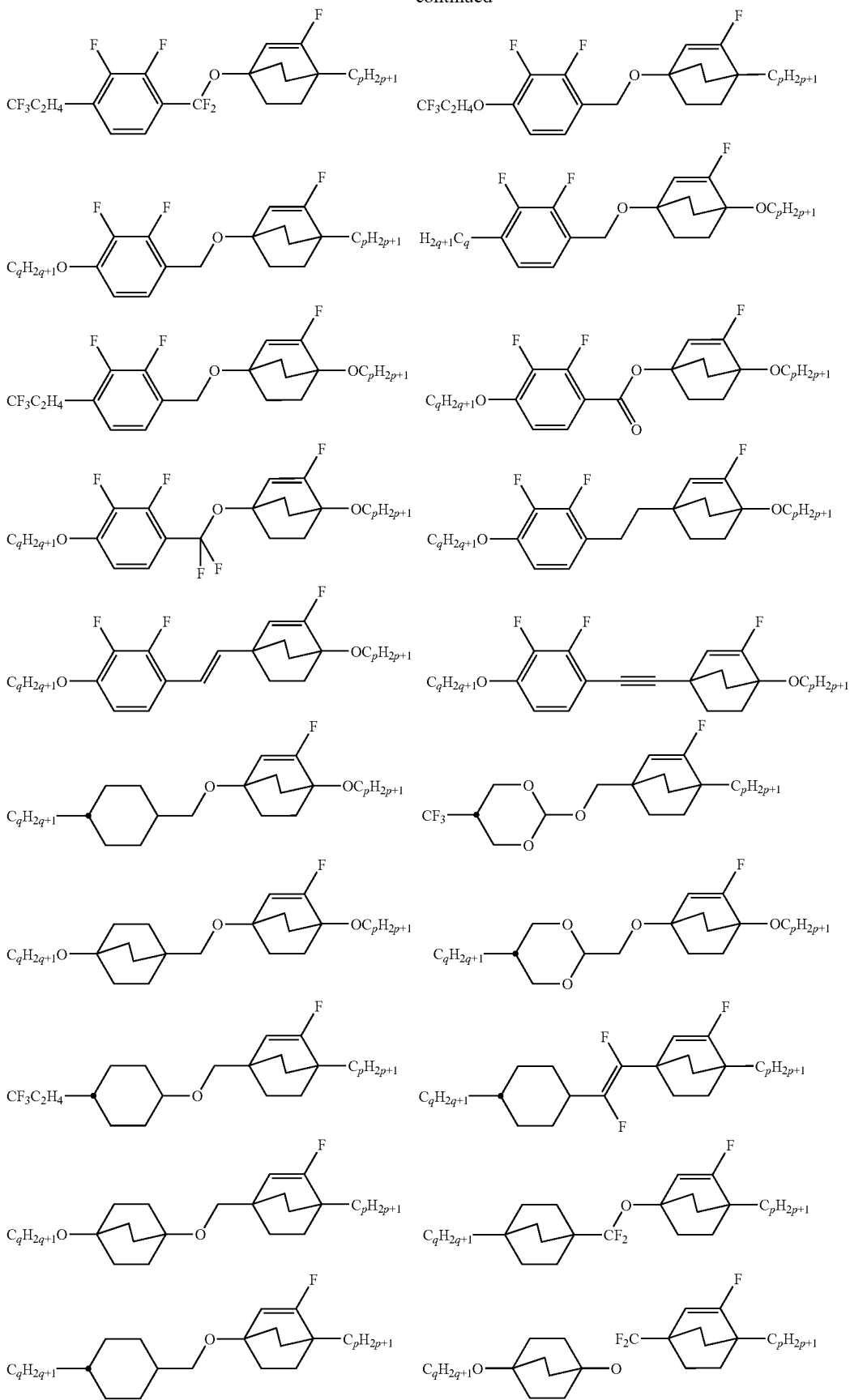

-continued
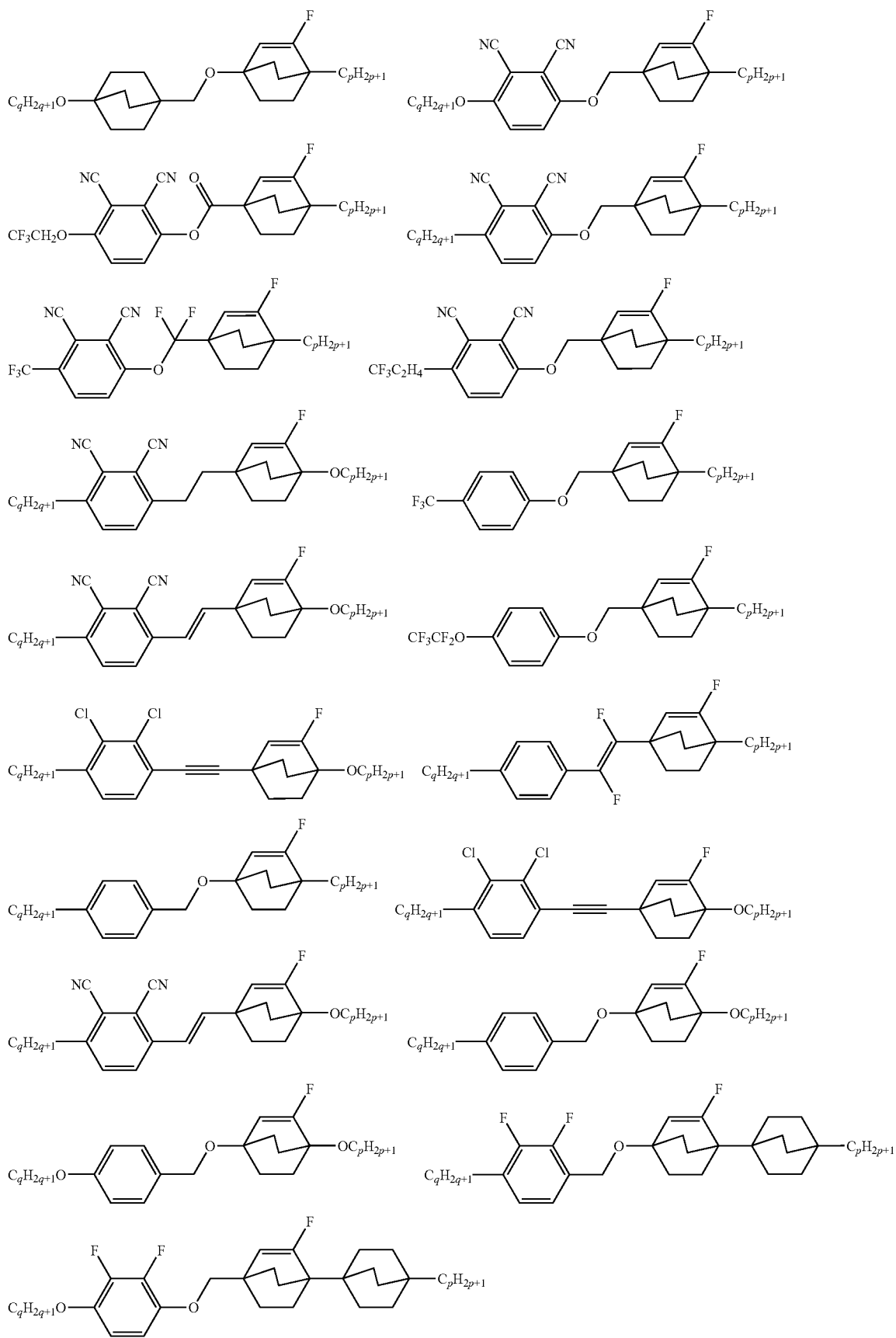

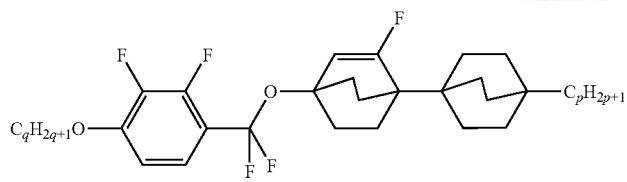
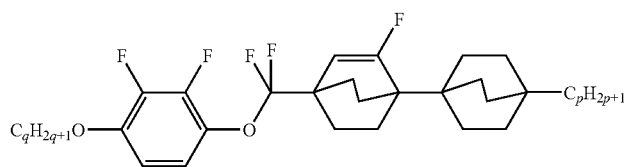
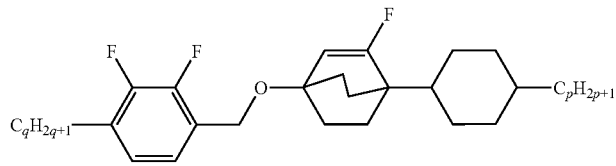
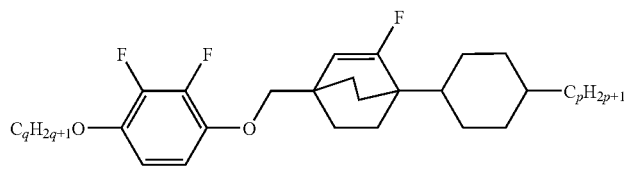
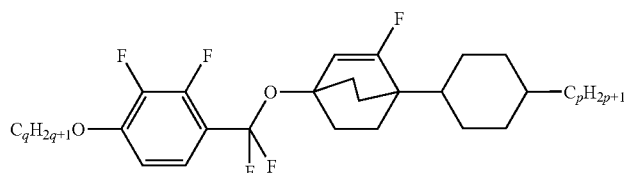
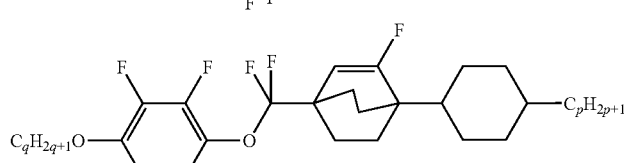
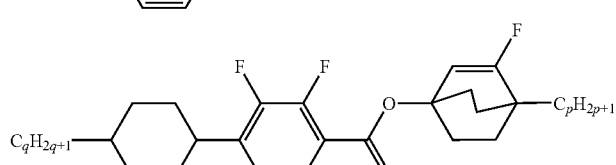
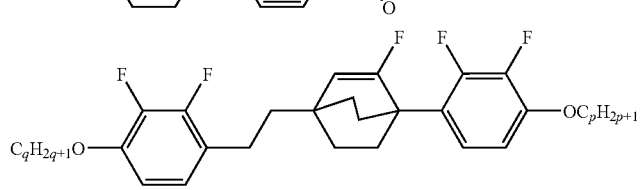
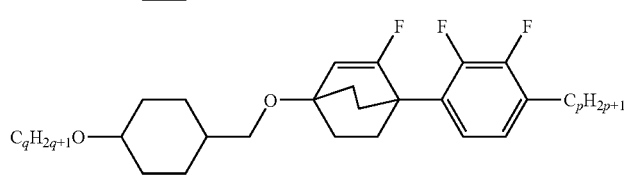
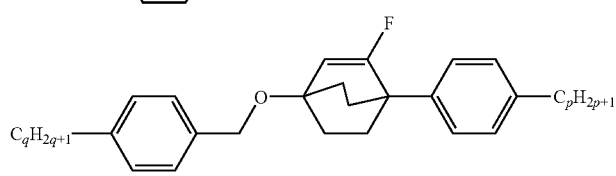

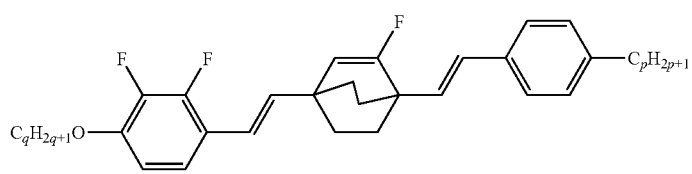
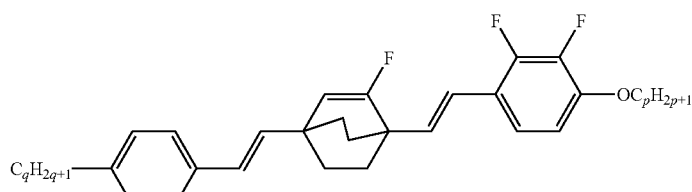
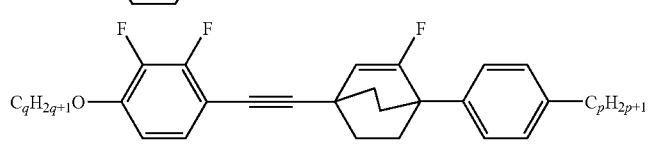
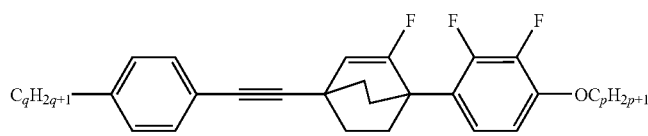
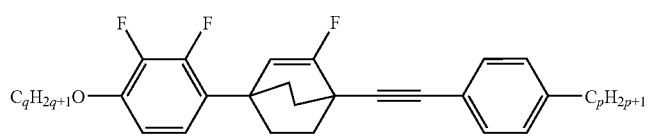
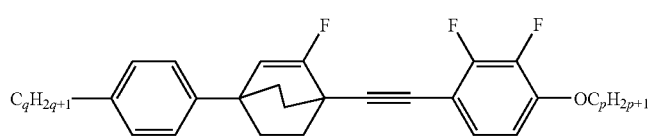
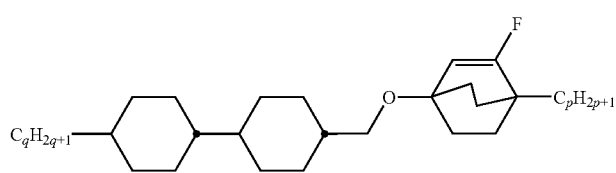
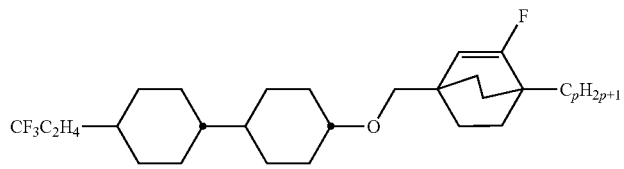
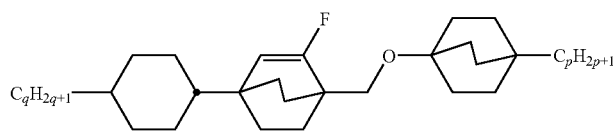
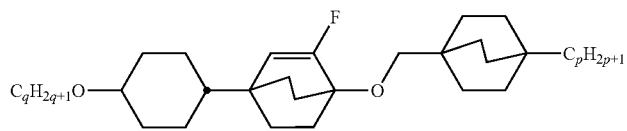
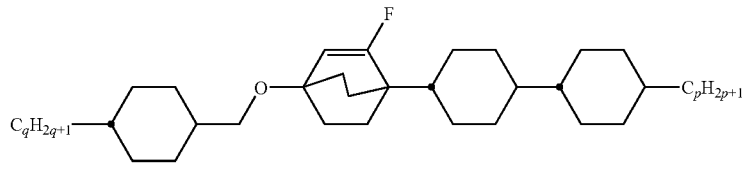

-continued
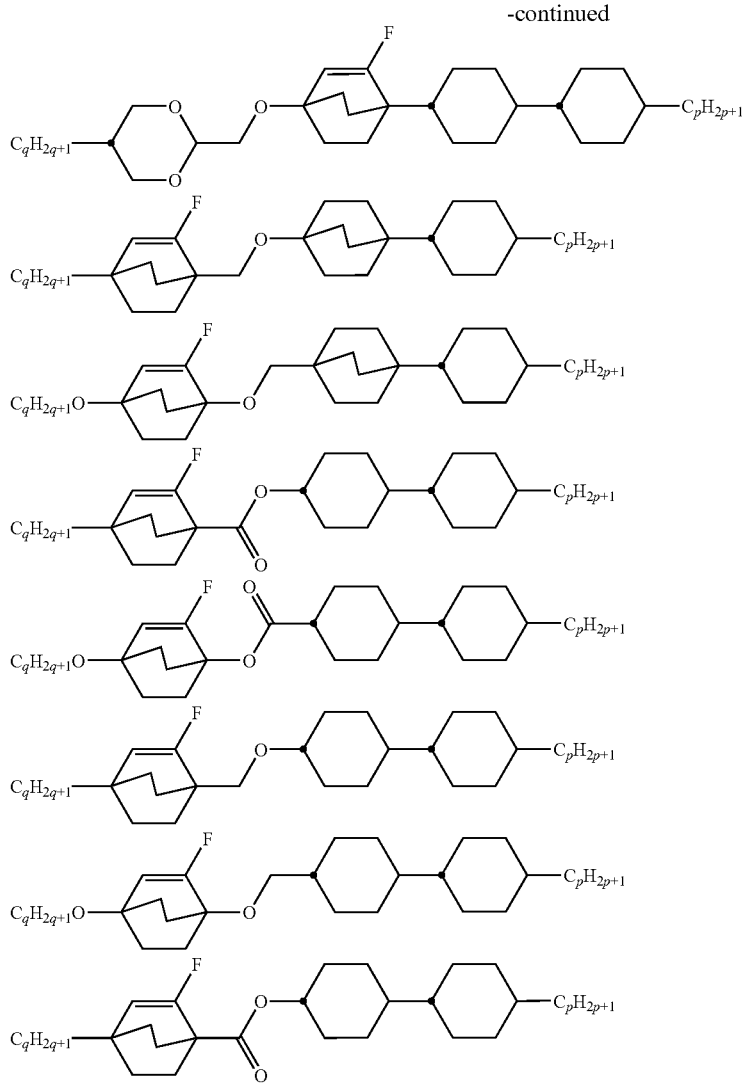
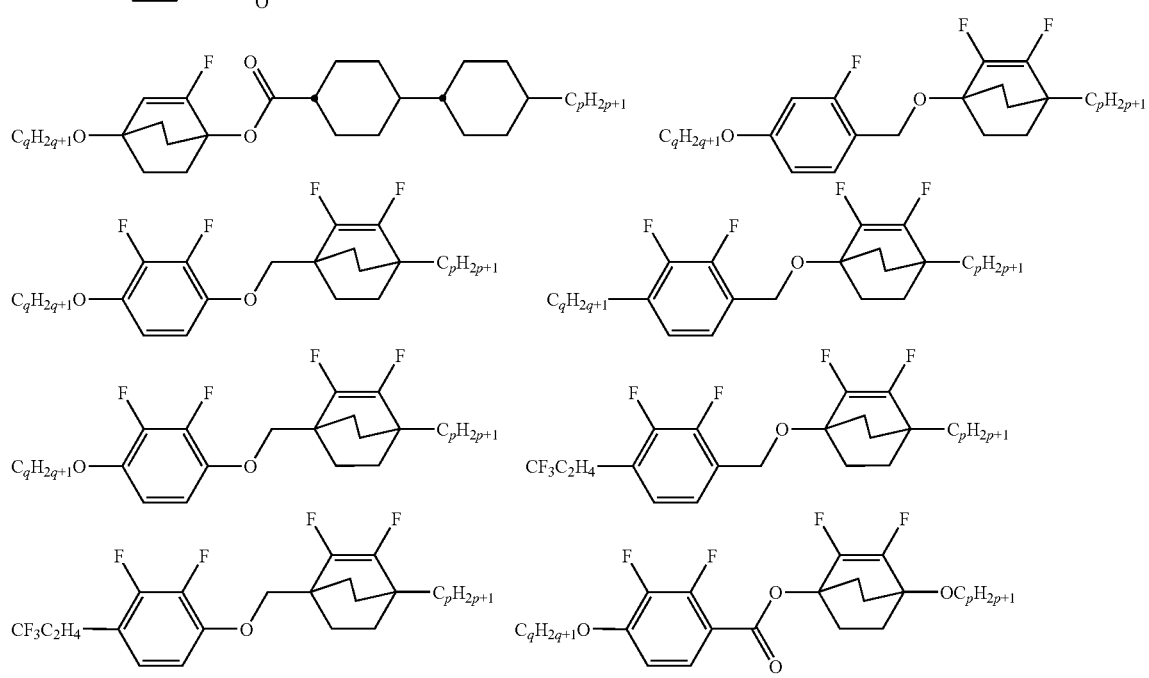

-continued
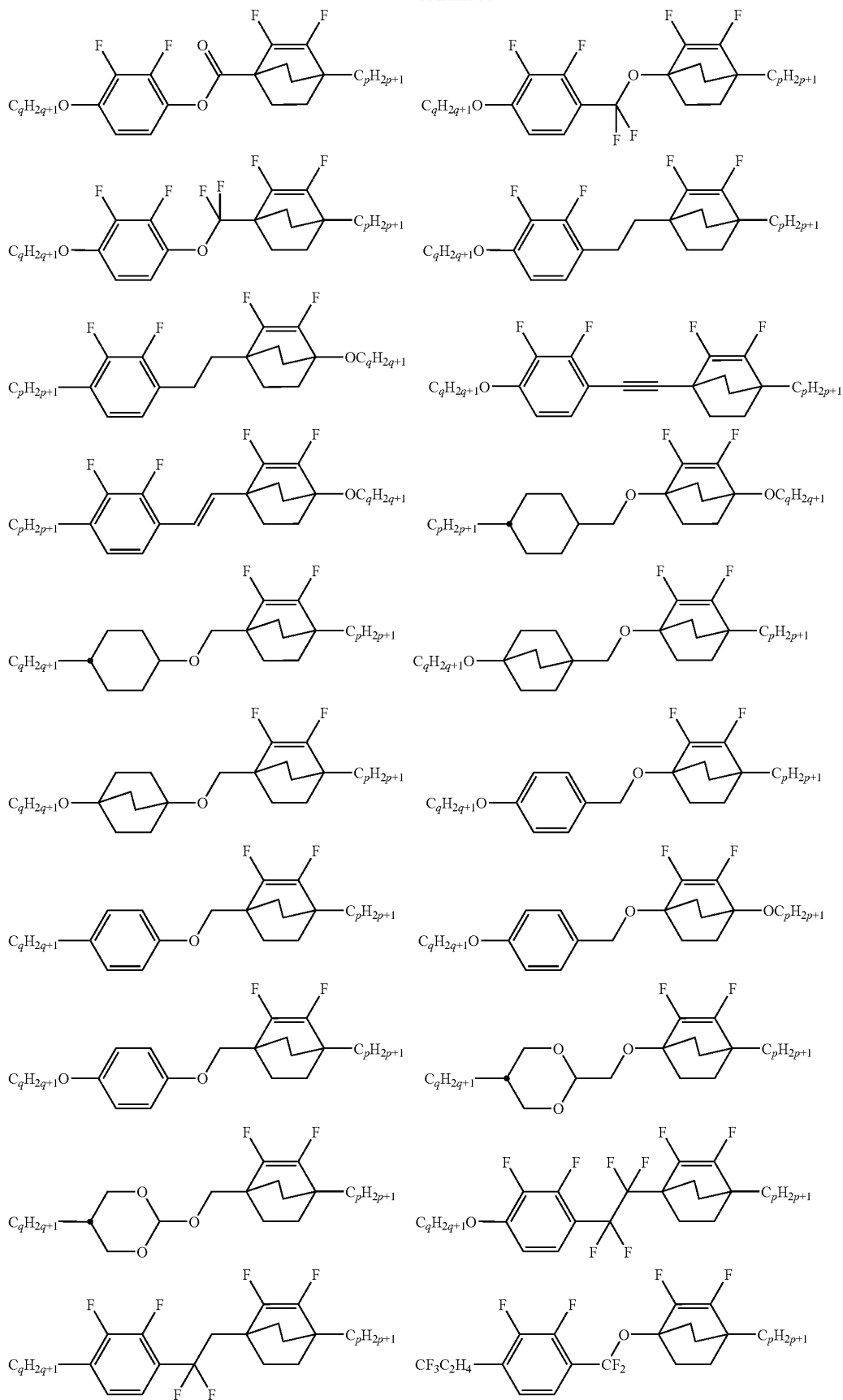

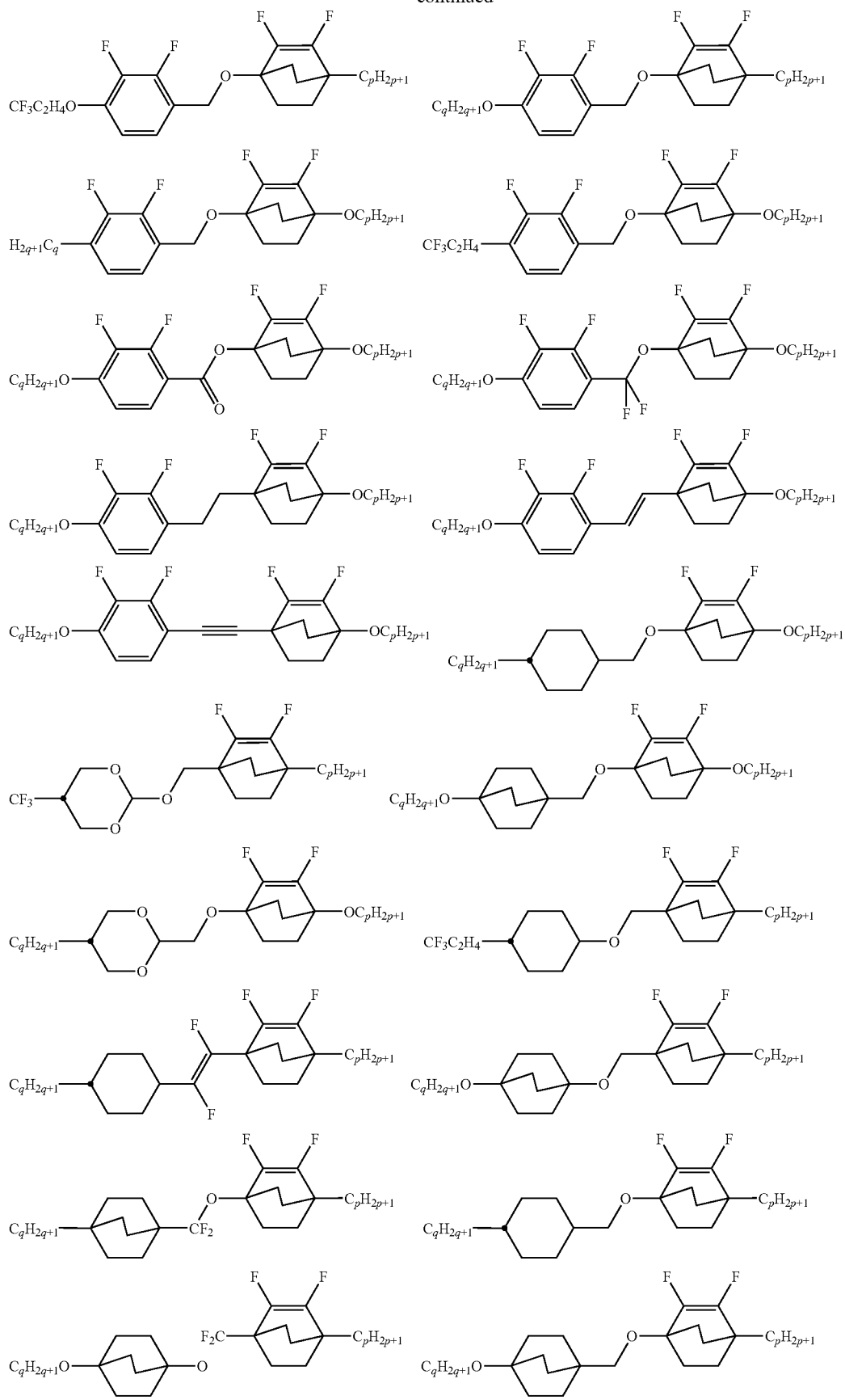

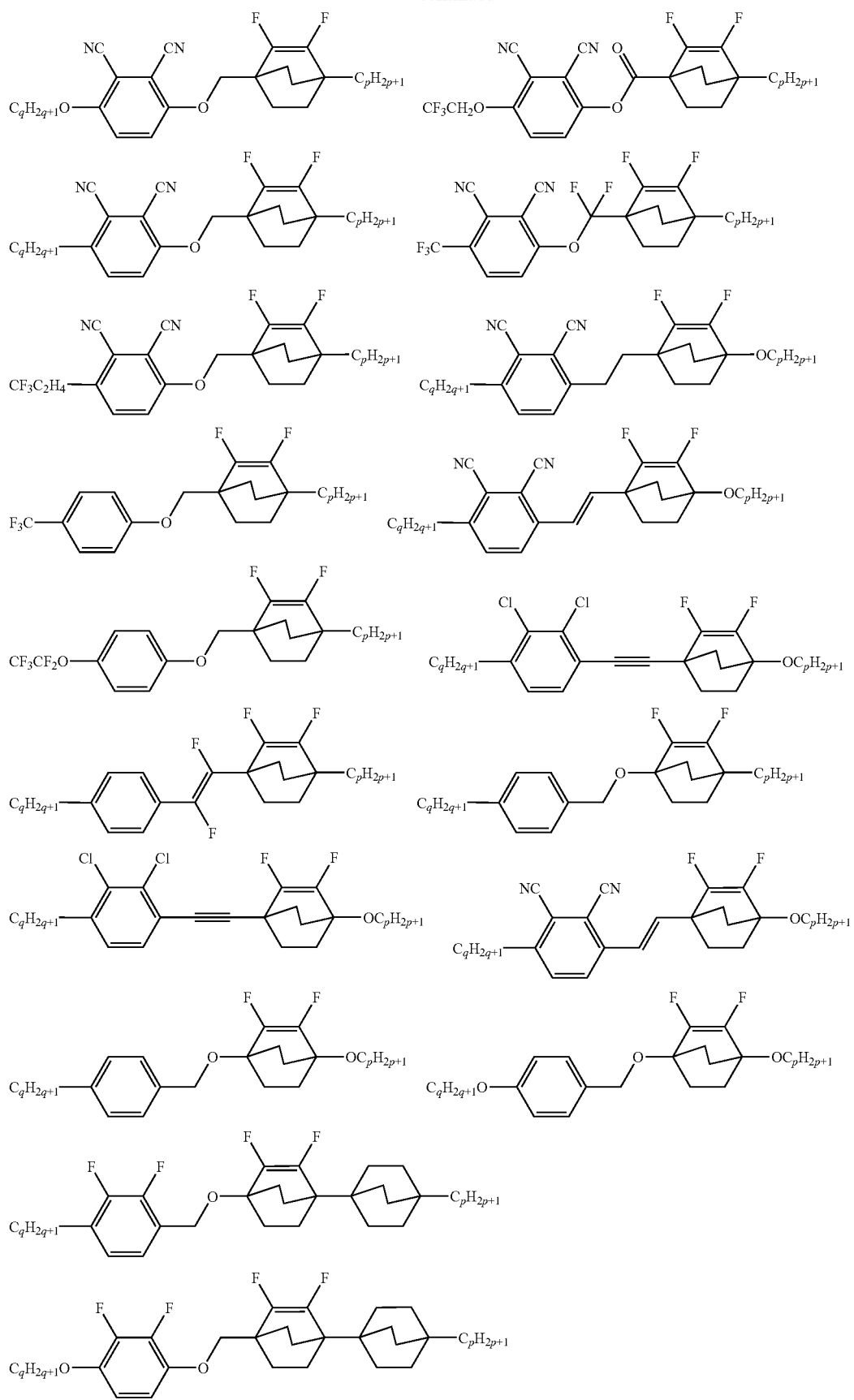

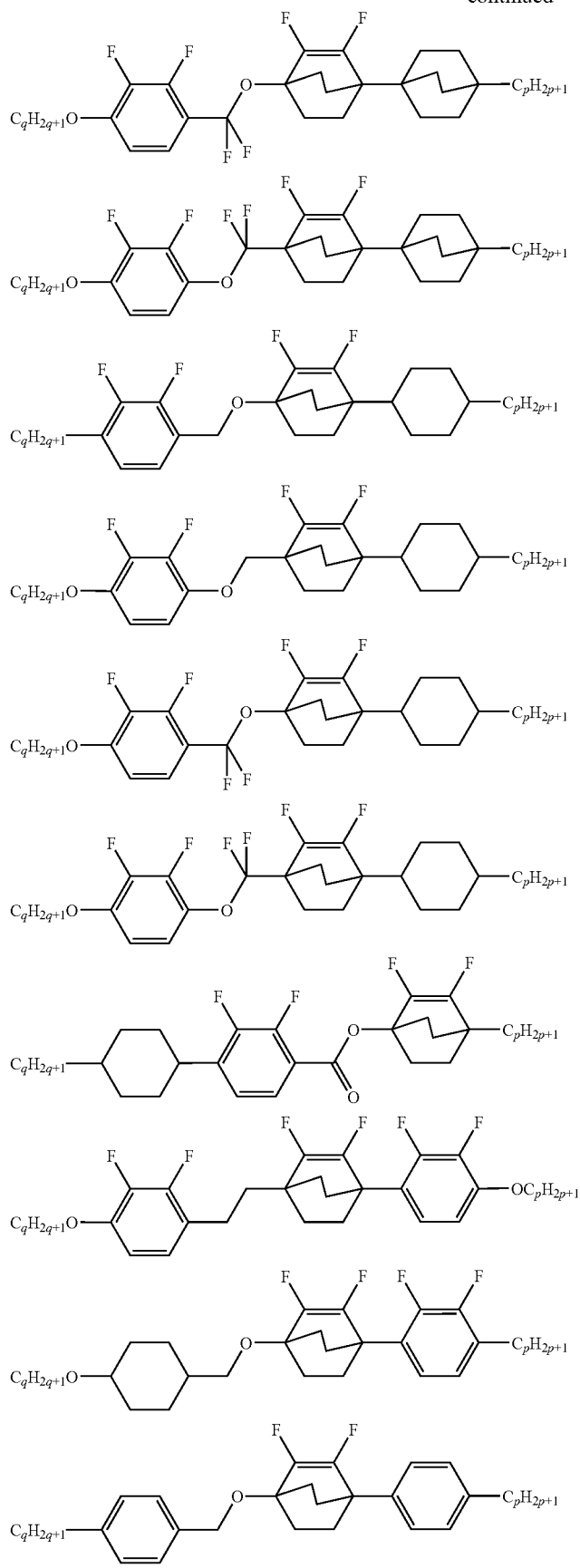

-continued
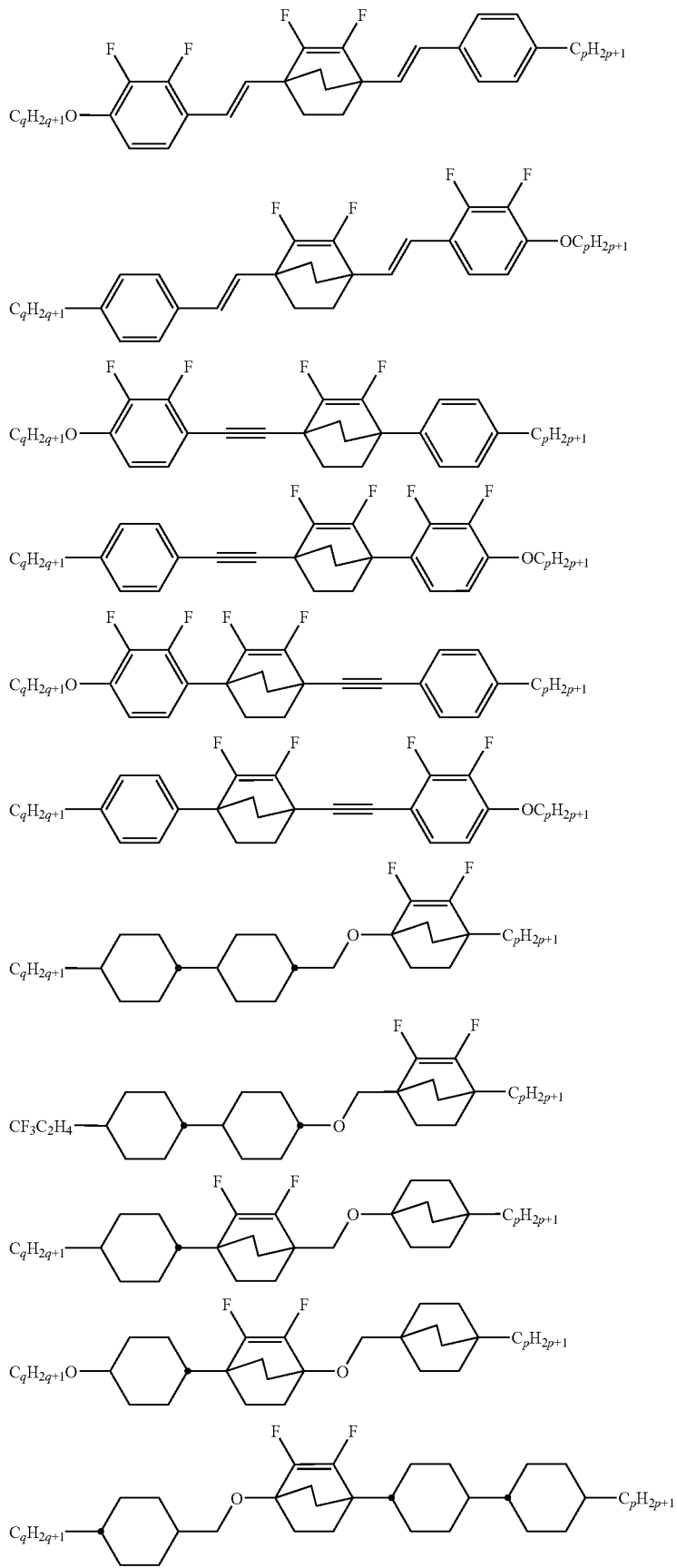

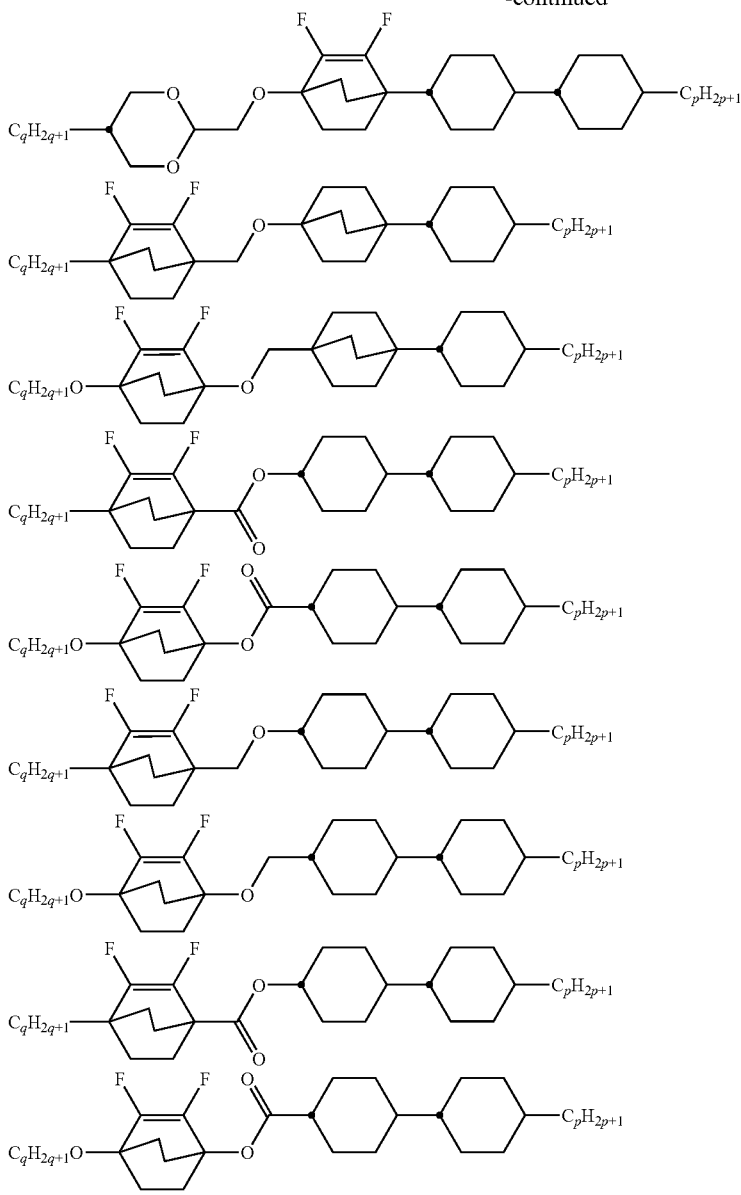

Method of Producing Compound Represented by Formula (III)

An example of the method of producing the compound represented by formula (III) includes a step of allowing the fluorobicyclo[2.2.2]octene compound represented by formula (VI) to react with fluorine gas.

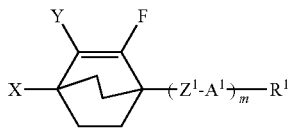

In the formula, X represents a halogen atom or $OR^3$ ($R^3$ represents a protective group of hydroxyl group, or, a group which functions as an elimination group in a form of $OR^3$). Y, $R^1$, $A^1$, $Z^1$ and m are defined similarly to those in formula (III).

Examples of the compounds represented by formula (VI) include various compounds producible by combining Y, $R^1$, $R^2$, $A^1$, $A^2$, $Z^1$, $Z^2$, m, n and X.

Preferable examples are listed below, without limiting the present invention.

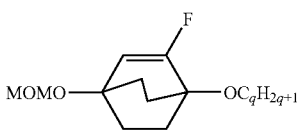

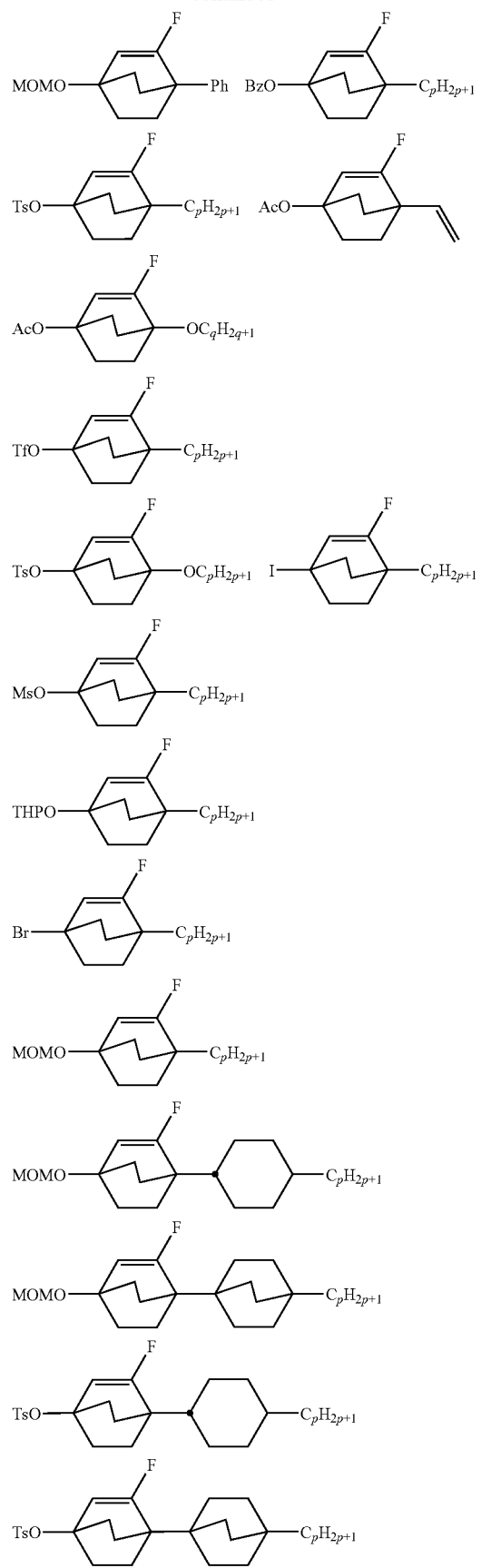
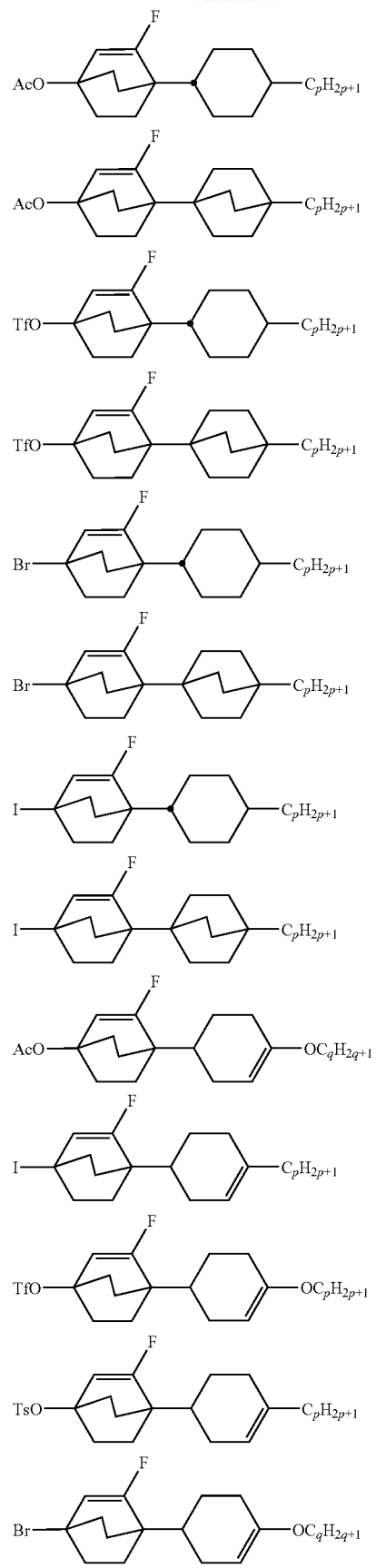

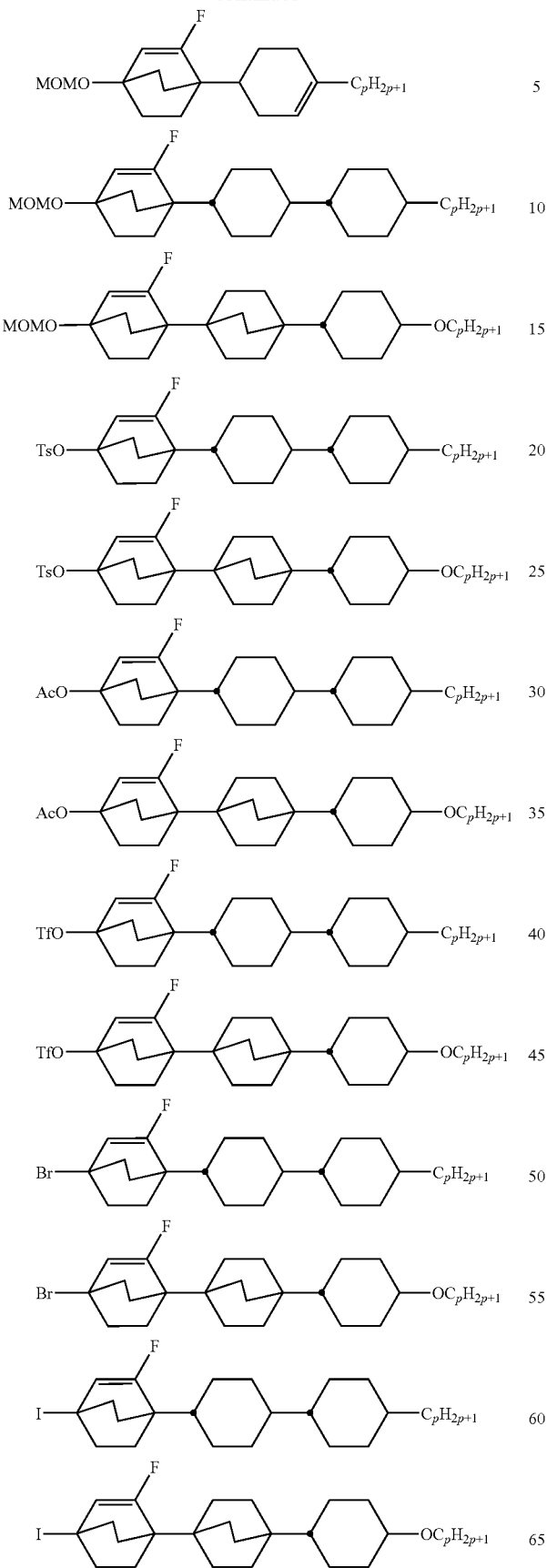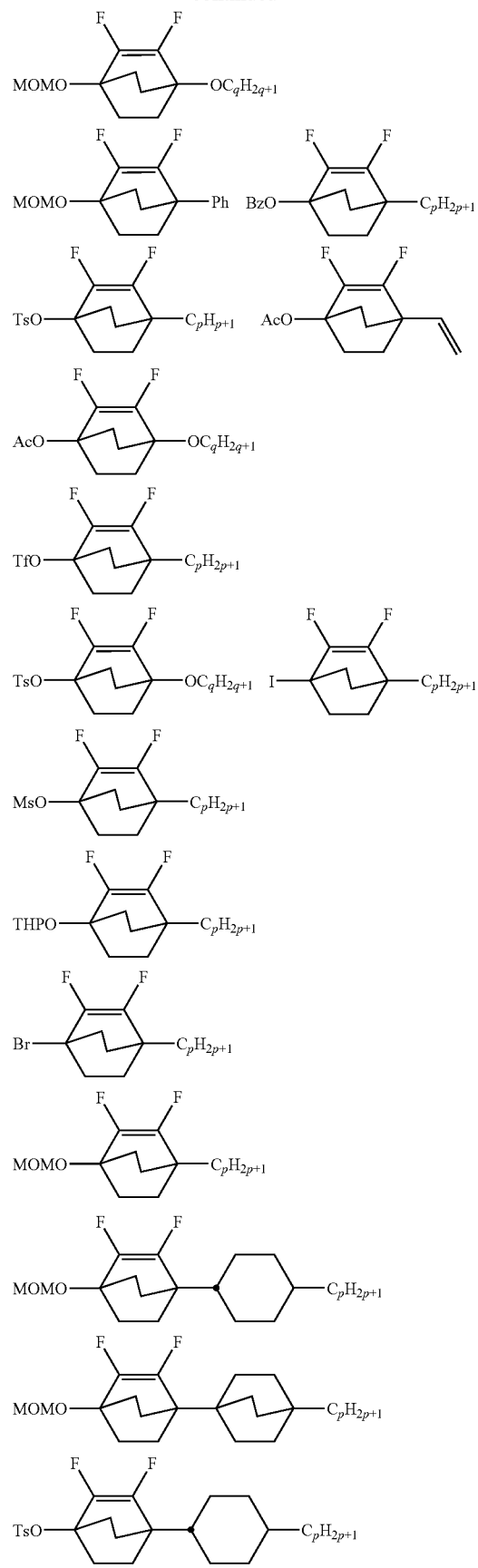

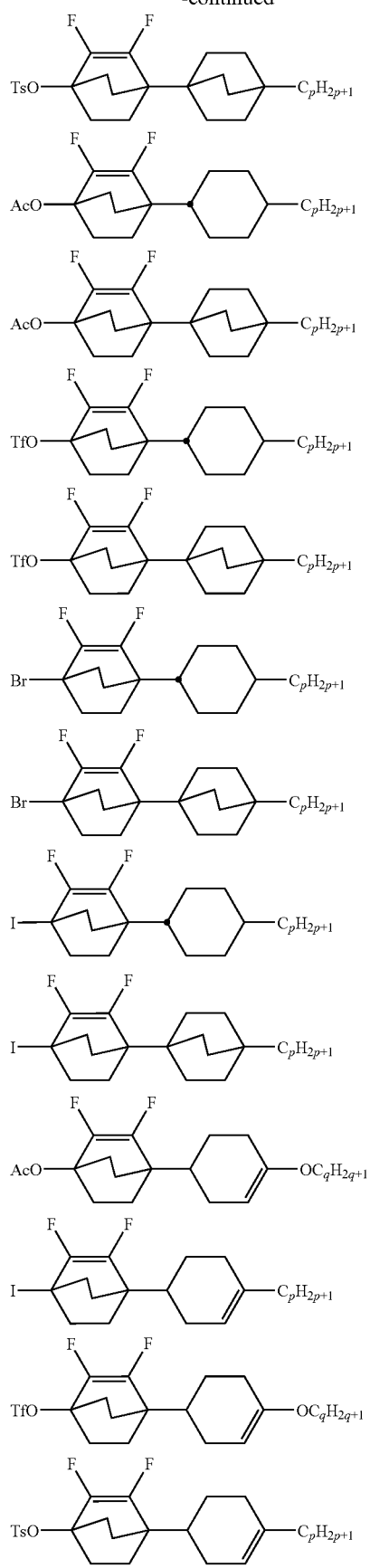
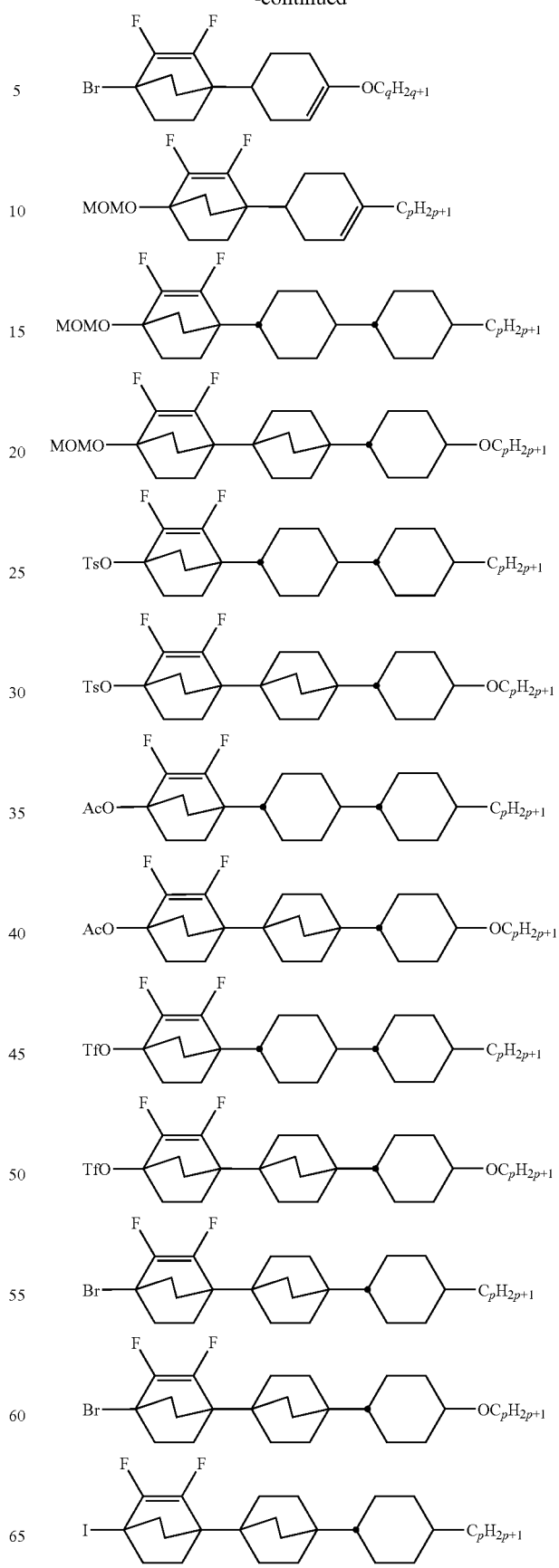

-continued

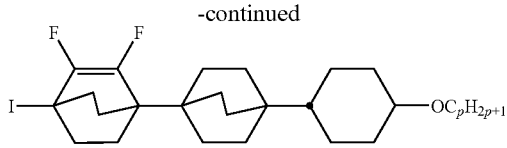
5

Each of p and q independently represents an integer from 1 to 9. Each of the groups represented by $C_pH_{2p+1}$ and $C_qH_{2q+1}$ is preferably a straight-chain group, and may have one or more hydrogen atoms thereof substituted by fluorine atom(s). Abbreviation Ac found in the formulae represents acetyl group, MOM represents methoxymethyl group, Ts represents tosyl group, THP represents tetrahydropyranyl group, Ms represents methanesulfonyl group, Tf represents trifluoromethane sulfonyl group, TMS represents trimethylsilyl group, Bn represents benzyl group, Bz represents benzoyl group, and Ph represents phenyl group.

Among the compounds represented by formula (V), and adoptable to the method of producing according to the present invention, the compounds having a hydrogen atom for Y may be manufacturable by a method which includes step (1) or (2), and additionally includes step (5) below:

(1) a step of allowing the bicyclo[2.2.2]octane compound represented by formula (Va) to react with a fluorinating agent; or (2) a step of allowing the bicyclo[2.2.2]octane compound represented by formula (Va) to react with the compound represented by formula (VII) below, and then allowing the obtained reaction product to react with a fluorinating agent; and (5) a step of eliminating HF from the compound represented by formula (Vb) below.

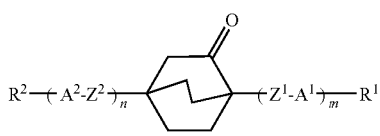
(Va)

In the formula, $R^1$, $R^2$, $A^1$, $A^2$, $Z^1$, $Z^2$, m and n are defined similarly to those in formula (II), and are therefore represented by similar preferable ranges.

$HS(CH_2)_tSH$ (VII)

In formula (VII), t represents an integer from 2 to 4.

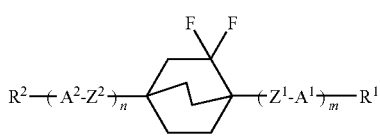
(Vb)

Among the compounds represented by formula (VI), the compounds having a hydrogen atom for Y may be prepared according to a method which includes step (3) or (4), and additionally includes step (6) below:

(3) a step of allowing the bicyclo[2.2.2]octane compound represented by formula (VIa) below to react with a fluorinating agent; or (4) a step of allowing the bicyclo[2.2.2]octane compound represented by formula (VIa) to react with the compound represented by formula (VII) below, and then allowing the obtained reaction product to react with a fluorinating agent; and (6) a step of eliminating HF from the compound represented by formula (VIb) below.

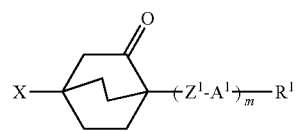
(VIa)

In the formula, $R^1$, $A^1$, X, $Z^1$ and m are defined similarly to those in formula (III).

$HS(CH_2)_tSH$ (VII)

In the formula, t represents an integer from 2 to 4.

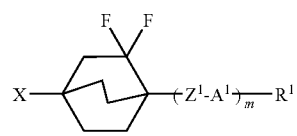
(VIb)

The compounds represented by formulae (Va) and (VIa), used as the starting materials in the steps (1) to (4), may be prepared by modifying hydroxyalkylbicyclo[2.2.2]octanone using appropriate reagents. Hydroxyalkyl bicyclo[2.2.2]octanone may be synthesized according to the method described, for example, in Journal of the Chemical Society, Perkin Transactions 2: Physical Organic Chemistry 1981, 1, 26-31. Alternatively, the method of producing according to Japanese Patent Application No. 2009-047780, using a hydroxybicyclooctanone compound represented by formula (Xa) as the starting material, may preferably be applicable since a high yield ratio may be attainable.

Examples of the fluorinating agent used for the steps (1) to (4) include diethylaminosulfo trifluoride (DAST), 2,2-difluoro-1,3-dimethylimidazolidine (DFI), bis(2-methoxyethyl)aminosulfur trifluoride, pyridinium poly(hydrogen fluoride) and so forth.

Reaction between the compound represented by formula (Va) or (VIa), and a fluorinating agent may preferably be allowed to proceed in a well-closed container with the atmosphere therein replaced with an inert gas such as nitrogen gas, so as to avoid any influences of atmospheric moisture and so forth. Temperature of the reaction may preferably be adjusted, but not limited, to 25 to 60° C. or around, and the reaction time may preferably be adjusted, but not limited, to 24 to 48 hours.

In the steps (2) and (4), the compound represented by formula (Va) or (VIa), and the compound represented by formula (VII) are allowed to react to produce a thioacetal derivative. In the reaction, the reaction temperature may be adjusted, but not limited, to −10 to 0° C. or around, and reaction time may be adjusted, but not limited, to 1 to 12 hours or around. The solvent is preferably a halogen-containing solvent such as dichloromethane, dichloroethane and so forth, and is preferably used under the presence of boron trifluoride etherate as a dehydrating agent.

Preferable conditions adoptable in the steps (2) and (4), for the reaction of the reaction product obtained between the compound represented by formula (Va) or (VIa) and the compound represented by formula (VII), with the fluorinating agent conform to those of methods described in Journal of Fluorine Chemistry 1994, 69, 127-128, and Journal of Organic Chemistry 1986, 51, 3508-3513.

The steps (5) and (6) are steps of removing HF from the compound represented by formulae (Vb) or (VIb), obtained after the step (1) or (2), followed by the step (3) or (4), to thereby obtain the compounds represented by formula (V) or (VI). The step of removing HF may preferably be proceeded in a liquid phase. The reaction may preferably be proceeded under a basic condition in view of promoting removal of HF, although the pH condition is not specifically limited. In order to condition the reaction system to a basic one, the reaction system may be added with an alkaline substance. Examples of the alkaline substance addible thereto include general inorganic compounds such as lithium hydroxide, sodium hydroxide, potassium hydroxide and calcium hydroxide; aliphatic amines such as triethylamine and ethyldiisopropyl amine; and aromatic amines such as pyridine and aniline.

The step of removing HF may alternatively be proceeded under an acidic condition, in order to promote removal of HF. In order to condition the reaction system to an acidic one, the reaction system may be added with an acid. Examples of the acid addible thereto include general Brønsted acids such as sulfuric acid and hydrochloric acid; and Lewis acids such as boron trifluoride ether complex and aluminum trichloride.

The step of removing HF may be proceeded under a high temperature condition, in order to promote removal of HF. The reaction temperature is preferably adjusted, but not limited, to 100 to 200° C.

Among the compounds represented by formulae (V) and (VI), used as the starting material, those having a fluorine atom for Y may be synthesized typically by obtaining the compound represented by formula (III) which has a hydrogen atom for Y, followed by removal of HF.

In the method of the present invention, the compound represented by formula (II) or (III) may be obtained by allowing the compound represented by formula (V) or (VI) obtained by the above-described methods to react with fluorine gas. The step may be proceeded under low temperature conditions, in order to suppress side-reactions. The reaction temperature is preferably adjusted, but not limited, to −120 to 0° C.

One example of the method of producing the compound represented by formula (III) is a method shown in Scheme 1 below.

Scheme 1

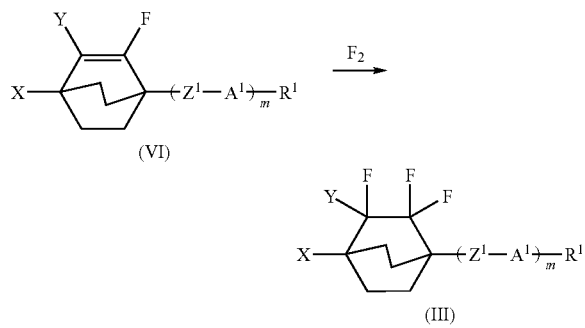

One example of the method of producing the compound represented by formula (II) is a method shown in Scheme 2 below.

Scheme 2

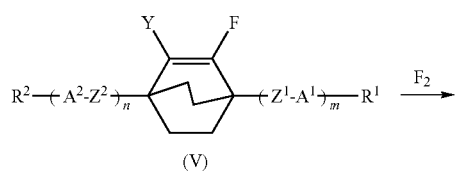

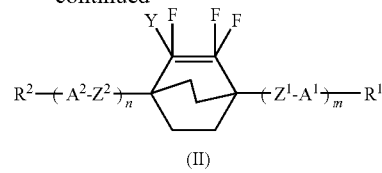

The compound represented by formula (II) may also be prepared according to a method shown in Scheme 3 below.

Scheme 3

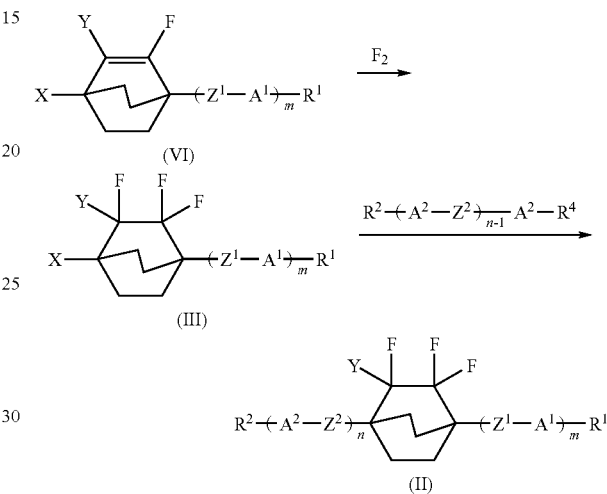

In the formula, $R^4$ represents a monovalent group. The conversion from (III) to (II) may be carried out via one step or via two or more steps including any conversion to any deprotective group or elimination group.

Liquid Crystal Composition

The present invention also relates to a liquid crystal composition containing at least one species of the compound which has the skeleton represented by formula (I), that is the fluorobicyclo[2.2.2]octane skeleton.

The liquid crystal composition of the present invention, in particular the composition embodied to contain the composition represented by formula (II), is characterized in that it has a larger negative dielectric anisotropy $\Delta\in$, as compared with that of the compound having the non-substituted bicyclo[2.2.2]octane skeleton. For example, as discussed later in Examples, the fluorobicyclo[2.2.2]octane compound (in particular, the compounds represented by formula (II)) may be exemplified by those having a $\Delta\in$ of −4 or smaller. In general, liquid crystal materials, having a $\Delta\in$ of −2 or smaller and a $\Delta n$ of 0.07 or larger, are preferable as materials used in the VA mode liquid crystal element; and examples of the compound having the skeleton represented by formula (I) (in particular, the compound represented by formula (II)) include various compounds which satisfy these characteristics. The compounds are particularly preferably adoptable to liquid crystal materials for the VA mode liquid crystal display element. The compound of the present invention represented by formula (II) or (III) is also useful as a major source or additive of optically anistropic elements such as retardation plate, and as an intermediate of the compound for liquid crystal material used for producing the elements.

Liquid Crystal Display Device

The present invention also relates to a liquid crystal display device which has two polarizer films disposed so that the absorption axes thereof are orthogonal to each other; and a liquid crystal cell having a pair of substrates, and liquid crystal layer held between the pair of substrates, and disposed between two polarizer films. The liquid crystal layer contains the liquid crystal composition of the present invention. The liquid crystal composition of the present invention is characterized by having a large negative dielectric anisotropy, and is therefore particularly suitable for the VA mode liquid crystal display device.

EXAMPLES

The present invention will be explained to further detail, referring to Examples. Note that the materials, reagents, amounts and ratios of substances, operations and so forth explained in Examples below may appropriately be modified without departing from the spirit of the present invention. The scope of the present invention is, therefore, not limited to the specific examples described below.

The individual measurements in Examples were carried out according to the methods below.

<Measurement of Dielectric Anisotropy $\Delta\varepsilon$ of Compounds>

Method of measuring dielectric anisotropy $\Delta\varepsilon$ of the compounds is as follows. A sample compound to be measured was dissolved into nematic liquid crystal composition A below, so as to adjust the content to 5 to 20% by mass, to thereby prepare a nematic liquid crystal composition. Dielectric anisotropy $\Delta\varepsilon$ of the thus-obtained nematic liquid crystal composition was measured using a frequency response analyzer (from TOYO Corporation, 1255B, trade name). The liquid crystal cell, used herein for the measurement of dielectric constant $\varepsilon_{//}$ in the direction in parallel with the long axis of molecule, has a pair of glass substrate (1.1 mm thick) having transparent ITO electrode layers formed thereon, having a cell gap of 8 μm with an epoxy resin seal, and having a polyimide alignment film for vertical alignment (from JSR Corporation, JALS-2021, trade name) formed on each of the opposing surfaces thereof. The liquid crystal cell, used herein for the measurement of dielectric constant $\varepsilon_{\perp}$ in the direction normal to the long axis of molecule, has a pair of substrates glass substrate (1.1 mm thick) having transparent ITO electrodes formed thereon, having a cell gap of 8 μm with an epoxy resin seal, and having a alignment film for horizontal alignment (Nissan Chemical Industries, Ltd., SE-130, trade name) formed on each of the opposing surfaces. The dielectric anisotropy $\Delta\varepsilon$ was defined as $\varepsilon_{//}-\varepsilon_{\perp}$. The dielectric anisotropy $\Delta\varepsilon$ was measured at 25° C., in a frequency range from 100 to 1000 Hz, and an average value of measurement results obtained at 100, 400 and 1000 Hz was adopted as measurement value. The dielectric anisotropy $\Delta\varepsilon$ of the sample to be measured was calculated by extrapolation, based on a known $\Delta\varepsilon$ value of nematic liquid crystal composition A of −1.33 at 25° C. Compositional ratio on the weight basis of liquid crystal composition A is shown below.

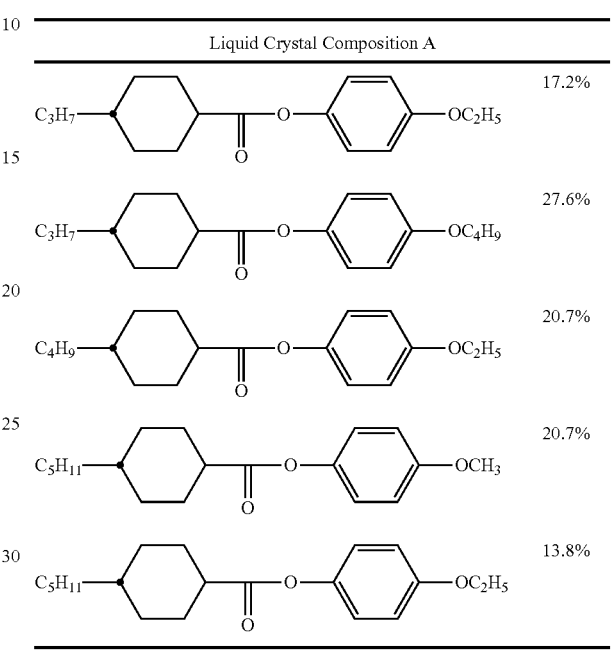

Liquid Crystal Composition A

Example 1

Synthesis of Compounds Represented by Formulae (II) and (III)

Synthesis of 3-Fluoro-1-Hydroxy-4-n-Propylbicyclo[2.2.2]-2-Octene (1)

3-Fluoro-1-hydroxy-4-n-propylbicyclo[2.2.2]-2-octene (1) was synthesized according to the scheme shown below.

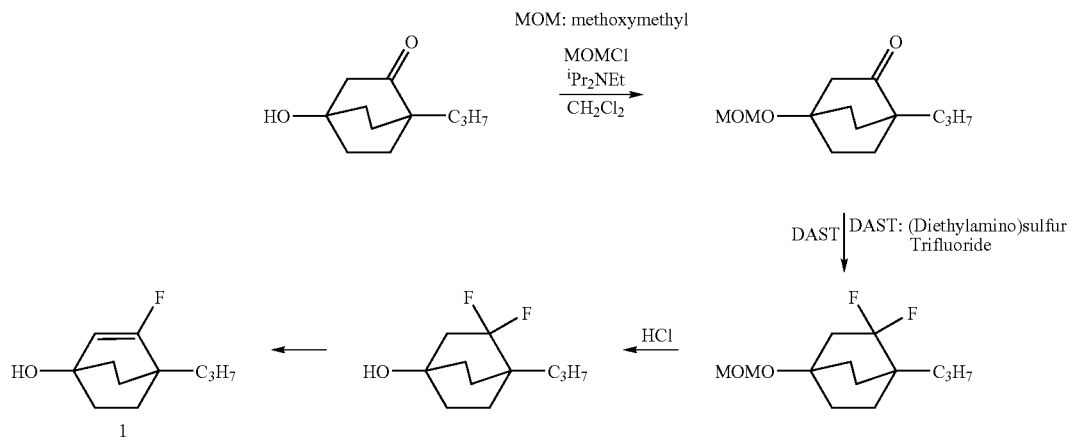

1-Hydroxy-4-n-propylbicyclo[2.2.2]octane-3-one (6.14 g), chloromethyl methyl ether (3.8 mL), and N,N-diisopropylethylamine (8.8 mL) were added to methylene chloride (100 mL), and the mixture was heated to a reflux temperature. The mixture was stirred at this temperature for 6 hours, then cooled to room temperature, and added with water (100 mL) to terminate the reaction. The reaction mixture was extracted three times using ethyl acetate, the obtained organic layers were combined, and washed sequentially with a 0.5 M hydrochloric acid, saturated sodium chloride solution, and saturated aqueous sodium hydrogen carbonate solution. The organic layer was dried over anhydrous sodium sulfate, and the solvent was then vaporized off under reduced pressure, to thereby obtain a crude product. The Crude product was purified by silica gel column chromatography (hexane/ethyl acetate=8:2), to thereby obtain 1-methoxymethyloxy-4-n-propylbicyclo[2.2.2]octane-3-one (yield=7.54 g, yield ratio=99%) as a colorless clear oily substance.

$^1$H-NMR (CDCl$_3$, 300 MHz): 0.91 (t, 3H, J=6.9 Hz), 1.23-1.36 (m, 4H), 1.59-1.83 (m, 8H), 2.51 (s, 2H), 3.36 (s, 3H), 4.74 (s, 2H).

1-Methoxymethyloxy-4-n-propylbicyclo[2.2.2]octane-3-one (2.49 g) and (N,N-diethylamino)sulfur trifluoride (15 mL) were placed in a sealed reaction vessel (from Taiatsu Techno Corporation) with a Teflon (registered trademark) inner cylinder, and the vessel was tightly closed. The reaction vessel was then heated to 60° C., and the content was stirred for 48 hours. The reaction solution was diluted with methylene chloride (100 mL), and dropped into a 1 mol/L potassium hydroxide solution at 0° C., to thereby terminate the reaction. The reaction mixture was extracted three times using methylene chloride, the organic layers were combined, and washed sequentially with saturated aqueous sodium hydrogen carbonate solution and saturated sodium chloride solution. The organic layer was dried over anhydrous sodium sulfate, and the solvent was vaporized off under reduced pressure, to thereby obtain a crude product. The crude product was then purified by silica gel column chromatography (hexane/ethyl acetate=95:5), to thereby obtain 1-methoxymethyloxy-3,3-difluoro-4-n-propylbicyclo[2.2.2]octane (yield=1.80 g, yield ratio=66%) as a colorless clear oily substance.

$^1$H-NMR (CDCl$_3$, 300 MHz): 0.90 (t, 3H, J=6.9 Hz), 1.14-1.41 (m, 4H), 1.50-1.75 (m, 8H), 2.11 (t, 2H, J$_{H-F}$=17.1 Hz), 3.36 (s, 3H), 4.70 (s, 2H).

The thus-obtained, 1-methoxymethyloxy-3,3-difluoro-4-n-propylbicyclo[2.2.2]octane and a 6 mol/L hydrochloric acid (10 mL) were dissolved into THF (100 mL), and the mixture was stirred at 50° C. for 2 hours. Water (100 mL) was added to the mixture to terminate the reaction, the organic layer was extracted three times with ethyl acetate, the organic layers were combined, and then washed sequentially using saturated aqueous sodium hydrogen carbonate solution and saturated sodium chloride solution. The organic layer was dried over anhydrous sodium sulfate, and the solvent was then vaporized off under reduced pressure, to thereby obtain a crude product. The crude product was purified by silica gel column chromatography (hexane/ethyl acetate=7:3), to thereby obtain 3,3-difluoro-1-hydroxy-4-n-propylbicyclo[2.2.2]octane (yield=1.8 g, yield ratio=99%) as a colorless clear crystal.

$^1$H-NMR (CDCl$_3$, 300 MHz): 0.90 (t, 3H, J=6.9 Hz), 1.15-1.41 (m, 4H), 1.50-1.75 (m, 8H), 2.21 (t, 2H, J=17.1 Hz), 3.32 (s, 3H), 4.70 (s, 2H).

Synthesis of 3-Fluoro-1-Hydroxy-4-n-Propylbicyclo[2.2.2]-2-Octene (1)

3,3-Difluoro-1-hydroxy-4-n-propylbicyclo[2.2.2]octane (0.58 g), potassium hydroxide (0.60 g) and Shelisol TK (2.0 g, from Shell Chemicals Japan, trade name) were mixed and stirred at 180° C. for 2.5 hours. The mixture was acidified by adding hydrochloric acid, the organic layer was extracted three times with ethyl acetate, the organic layers were combined, and then washed with pure water. The organic layer was dried over anhydrous magnesium sulfate, and the solvent was vaporized off under reduced pressure, to thereby obtain a crude product. The crude product was then purified by silica gel column chromatography (hexane/ethyl acetate=3:1), to thereby obtain 3-fluoro-1-hydroxy-4-n-propylbicyclo[2.2.2]-2-octene (1) (yield=0.39 g, yield ratio=75%) as a colorless clear crystal.

$^1$H-NMR (CDCl$_3$, 300 MHz): 0.94 (t, 3H, J=6.9 Hz), 1.30-1.60 (m, 10H), 1.60-1.72 (m, 2H), 1.72 (s, 1H), 5.38 (d, 1H, J=8.7 Hz).

$^{19}$F-NMR (CDCl$_3$, 300 MHz): −115.75 (d, 1F, J=8.7 Hz).

Using the thus-obtained, 3-fluoro-1-hydroxy-4-n-propylbicyclo[2.2.2]-2-octene (1) as the starting material, Exemplary Compounds (3) and (4) which are the compounds represented by formula (III), and Exemplary Compound (6) which is the compound represented by formula (II) were then prepared according to the scheme shown below. In the scheme below, 4-bromomethyl-1-ethoxy-2,3-difluorobenzene (5) used as a reagent was synthesized by combining the method described in Synlett, 1999, 4, 389 and a publicly-known method. Various solvents and reagents in the scheme below are those commercially available, used without modification.

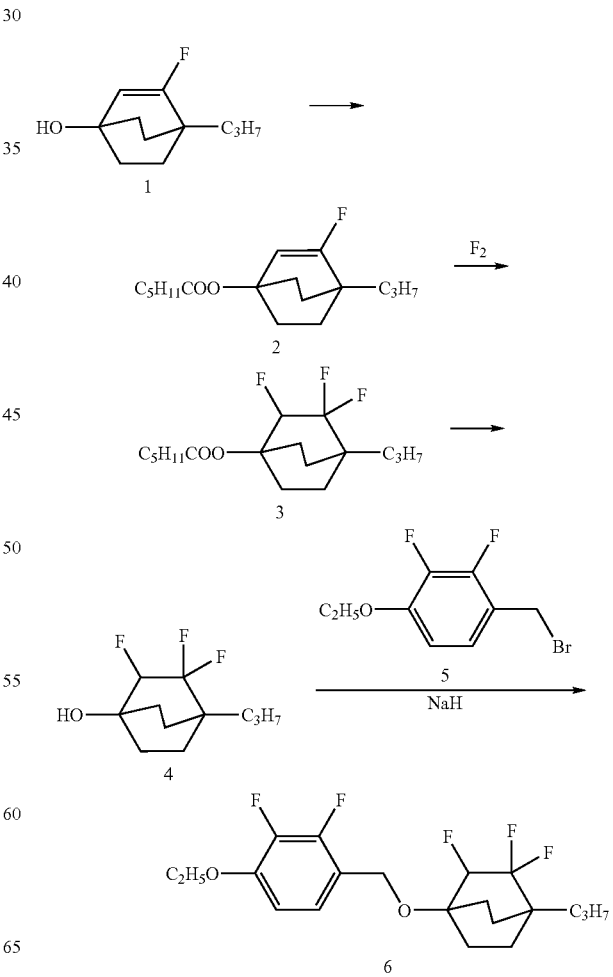

Synthesis of 3-Fluoro-1-Pentylcarbonyloxy-4-n-Propylbicyclo[2.2.2]-2-Octene (2)

Dimethylamino pyridine (27 mg) and pyridine (0.35 g) were added to a mixture of 3-fluoro-1-hydroxy-4-n-propyl-bicyclo[2.2.2]-2-octene (1) (0.41 g), hexanoyl chloride (0.45 g), and THF (2 mL), and the mixture was then stirred at 70° C. for 2 hours. The mixture was then added with water (10 mL) and ethyl acetate (50 mL), the organic layer was washed with pure water. The organic layer was dried over anhydrous magnesium sulfate, and the solvent was then vaporized off under reduced pressure, to thereby obtain a crude product. The crude product was then purified by silica gel column chromatography (hexane/ethyl acetate=40:1), to thereby obtain 3-fluoro-1-pentylcarbonyloxy-4-n-propylbicyclo[2.2.2]-2-octene (2) (yield=0.40 g, yield ratio=64%) as a colorless clear oily substance.

$^1$H-NMR (CDCl$_3$, 300 MHz): 0.90 (t, 3H, J=6.9 Hz), 0.94 (t, 3H, J=7.2 Hz), 1.30-1.70 (m, 14H), 1.75-1.95 (m, 4H), 2.29 (t, 2H, J=7.5 Hz), 5.61 (d, 1H, J=9.0 Hz).

$^{19}$F-NMR (CDCl$_3$, 300 MHz): −116.47 (d, 1F, J=8.2 Hz).

Synthesis of 2,3,3-Trifluoro-1-Pentylcarbonyloxy-4-n-Propylbicyclo[2.2.2]octane (3)

A mixture of 3-fluoro-1-pentylcarbonyloxy-4-n-propylbicyclo[2.2.2]-2-octene (2) (0.4 g), sodium fluoride (0.59 g) and AK225 (715 g, from Asahi Glass Co., Ltd., trade name) was cooled to −77° C., a fluorine/nitrogen mixed gas (mole ratio=1:4) was blown thereinto at a flow rate of 10 mL/min for 24 minutes, and helium gas was then blown thereinto at a flow rate of 100 mL/min for 30 minutes. The reaction mixture was heated to room temperature, washed with aqueous sodium hydrogen carbonate solution, and dried over anhydrous magnesium sulfate. The solvent was vaporized off, and the residue was purified by silica gel column chromatography (hexane/ethyl acetate=40:1), to thereby obtain 2,3,3-trifluoro-1-pentylcarbonyloxy-4-n-propylbicyclo[2.2.2]octane (3) (yield=0.12 g, yield ratio=27%) as a colorless clear oily substance.

$^1$H-NMR (CDCl$_3$, 300 MHz): 0.82-0.98 (m, 6H), 1.22-2.50 (m, 20H), 5.09 (ddd, 1H, J=1.5, 19.5, 51.6 Hz).

$^{19}$F-NMR (CDCl$_3$, 300 MHz): −208.84 (dt, 1F, J=9.0, 52.5 Hz), −126.11 (ddd, 1F, J=5.6, 10.2, 247.9 Hz), −104.35 (ddd, 1F, J=7.3, 19.5, 248.4 Hz).

Synthesis of 2,3,3-Trifluoro-1-Hydroxy-4-n-Propyl-bicyclo[2.2.2]octane (4)

A mixture of 2,3,3-trifluoro-1-pentylcarbonyloxy-4-n-propylbicyclo[2.2.2]octane (3) (0.12 g), potassium hydroxide (0.11 g), water (0.5 mL) and ethanol (2.0 mL) was stirred at 70° C. for 20 minutes. The mixture was neutralized with hydrochloric acid, added with ethyl acetate (30 mL), and the organic layer was washed with aqueous sodium hydrogen carbonate solution. The organic layer was dried over anhydrous magnesium sulfate, the solvent was vaporized off under reduced pressure, to thereby obtain a crude product. The crude produce was purified by silica gel column chromatography (hexane/ethyl acetate=3:1), to thereby obtain 2,3,3-trifluoro-1-hydroxy-4-n-propylbicyclo[2.2.2]octane (4) (yield=82 mg, yield ratio=98%) as a colorless clear solid.

$^1$H-NMR (CDCl$_3$, 300 MHz): 0.91 (t, 3H, J=6.9 Hz), 1.22-2.00 (m, 13H), 4.40 (ddd, 1H, J=0.9, 19.8, 51.9 Hz).

$^{19}$F-NMR (CDCl$_3$, 300 MHz): −210.14 (dt, 1F, J=9.6, 51.6 Hz), −126.09 (ddd, 1F, J=5.1, 10.7, 248.2 Hz), −104.45 (ddd, 1F, J=3.5, 19.5, 249.0 Hz).

Synthesis of 1-(4'-Ethoxy-2',3'-Difluorophenyl)methyloxy-2,3,3-Trifluoro-4-n-Propyl bicyclo[2.2.2]octane (6)

2,3,3-Trifluoro-1-hydroxy-4-n-propylbicyclo[2.2.2]octane (4) (37.5 mg), and 4-bromomethyl-1-ethoxy-2,3-difluorobenzene (5) (65.4 mg) were added to a dimethyl formamide suspension (2.0 mL) of sodium hydride (4.9 mg), the mixture was stirred at room temperature for 2.5 hours, and then added with saturated aqueous ammonium chloride solution to thereby terminate the reaction. The organic layer was extracted three times with ethyl acetate, the organic layers were combined, and washed with saturated sodium chloride solution. The organic layer was dried over anhydrous sodium sulfate, and the solvent was then vaporized off under reduced pressure, to thereby obtain a crude product. The crude product was purified by silica gel column chromatography (hexane/ethyl acetate=9:1), to thereby obtain 1-(4'-ethoxy-2',3'-difluorophenyl)methyloxy-2,3,3-trifluoro-4-n-propyl bicyclo[2.2.2]octane (6) (yield=39.9 mg, yield ratio=60%) as a colorless clear crystal.

$^1$H-NMR (CDCl$_3$, 300 MHz): 0.91 (t, 3H, J=6.9 Hz), 1.22-2.00 (m, 14H), 4.10 (q, 2H, J=7.2 Hz), 4.54 (s, 2H), 4.60 (dd, 1H, J=18.8, 51.9 Hz), 6.70 (ddd, 1H, J=2.1, 7.5, 9.0 Hz), 7.05 (dt, 1H, J=2.4, 7.5 Hz).

$^{19}$F-NMR (CDCl$_3$, 300 MHz): −204.64 (dt, 1F, J=9.6, 51.9 Hz), −159.62 (ddd, 1F, J=2.5, 7.3, 19.7 Hz), −142.64 (dd, 1F, J=7.6, 19.7 Hz), −126.40 (ddd, 1F, J=5.6, 11.3, 248.4 Hz), −104.04 (ddd, 1F, J=6.2, 19.5, 248.4 Hz).

The phase transition temperature: Cr 75 degrees Celsius Iso.

Example 2

Synthesis of Compound Represented by Formula (II)

Exemplary Compound (8) represented by formula (II) was prepared according to the scheme shown below.

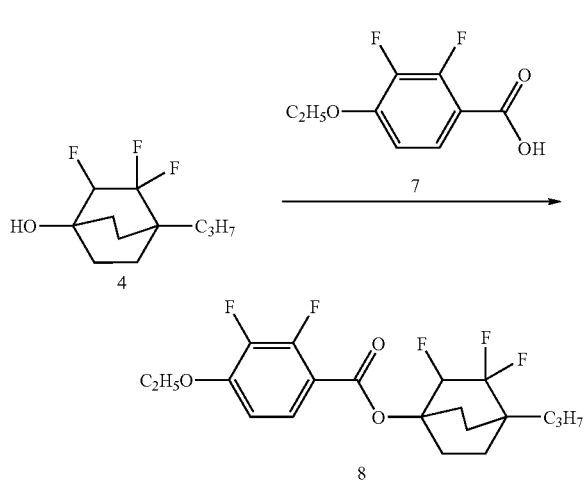

Synthesis of 4-Ethoxy-2,3-Difluorobenzoic Acid (7)

Acetone solution (140 mL) containing 4-ethoxy-2,3-difluorobenzyl alcohol (2.1 g) was dropped into a 1.5 M sulfuring acid solution (70 mL) containing chromium (III) oxide (4.23 g), at 0° C. over one hour. The reaction mixture was stirred at room temperature for 24 hours, and added with water to thereby terminate the reaction. The organic layer was extracted three times with ethyl acetate, the organic layers were combined, and the combined organic layer was extracted twice with a 1 M aqueous sodium hydroxide solution. The organic layer was then neutralized with a 2 M hydrochloric acid, extracted three times with ethyl acetate, the organic layers were combined, and the combined organic layer was washed with saturated sodium chloride solution. The organic layer was dried over anhydrous sodium sulfate, and the solvent was vaporized off under reduced pressure, to thereby obtain 4-ethoxy-2,3-difluorobenzoic acid (7) (yield=1.8 g, yield ratio=80%) as a white solid.

$^1$H-NMR (acetone-d6, 300 MHz): 1.45 (t, 3H, J=6.9 Hz), 4.23 (q, 2H, J=6.9 Hz), 7.07 (m, 1H), 7.75 (m, 1H).

$^{19}$F-NMR (acetone-d6, 282 MHz): −161 (m, 1F), −136 (m, 1F).

Synthesis of 2,3,3-Trifluoro-1-(4'-Ethoxy-2',3'-Difluorophenyl)carbonyloxy-4-n-Propylbicyclo[2.2.2]octane (8)

Methylene chloride solution containing 4-ethoxy-2,3-difluorobenzoic acid (7) (52.6 mg) and 2,3,3-trifluoro-1-hydroxy-4-n-propylbicyclo[2.2.2]octane (4) (39.0 mg) was added with N,N'-dicyclohexyl carbodiimide (53.0 mg) and 4-dimethylamino pyridine (7.0 mg), and the mixture was refluxed under heating for 11 hours. The mixture was then added with water to terminate the reaction, the organic layer was extracted three times with ethyl acetate, the organic layers were combined, and the combined organic layer was washed with saturated sodium chloride solution. The organic layer was dried over anhydrous sodium sulfate, and the solvent was then vaporized off under reduced pressure to thereby obtain a crude product. The crude product was purified by silica gel column chromatography (hexane/ethyl acetate=8:2), to thereby obtain 2,3,3-trifluoro-1-(4'-ethoxy-2',3'-difluorophenyl)carbonyloxy-4-n-propylbicyclo[2.2.2]octane (8) (yield=20.0 mg, yield ratio=28%) as a colorless clear crystal.

$^1$H-NMR (CDCl$_3$, 300 MHz): 0.92 (t, 3H, J=6.9 Hz), 1.25-1.77 (m, 11H), 2.09-2.26 (m, 4H), 4.16 (q, 2H, J=6.9 Hz), 5.19 (ddd, 1H, J$_1$=1.5, J$_2$=19.4, J$_3$=51.6 Hz), 6.74 (m, 1H), 7.62 (m, 1H).

$^{19}$F-NMR (CDCl$_3$, 282 MHz): −104 (ddd, 1F, J$_1$=5.5, J$_2$=19.4, J$_3$=248.2 Hz), −126 (ddd, 1F, J$_1$=5.5, J$_2$=10.0, J$_3$=248.2 Hz), −133 (m, 1F), −158 (m, 1F), −208 (m, 1F).

The phase transition temperature: Cr 130 degrees Celsius Iso.

Example 3

Synthesis of Compounds Represented by Formula (II) and Formula (III)

Synthesis of 2,3,3-Trifluoro-1-Hydroxy-4-n-Propylbicyclo[2.2.2]octene (9)

2,3-Difluoro-1-hydroxy-4-n-propylbicyclo[2.2.2]-2-octene (9) was synthesized using 2,3,3-trifluoro-1-hydroxy-4-n-propylbicyclo[2.2.2]octane (4) as the starting material, according to the scheme below.

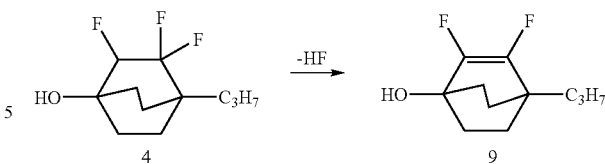

Synthesis of 2,3-Difluoro-1-Hydroxy-4-n-Propylbicyclo[2.2.2]-2-Octene (9)

2,3,3-Trifluoro-1-hydroxy-4-n-propylbicyclo[2.2.2]octane (4) (0.80 g), potassium hydroxide (0.60 g) and Shellsol TK (2.0 g, from Shell Chemicals Japan, trade name) were mixed and stirred at 150° C. for 2 hours. The mixture was neutralized with hydrochloric acid, the organic layer was then extracted three times with ethyl acetate, the organic layers were combined, and washed with pure water. The organic layer was dried over anhydrous sodium sulfate, and the solvent was vaporized off under reduced pressure, to thereby obtain a crude product. The crude product was purified by basic alumina column chromatography (hexane/ethyl acetate/pyridine=400:100:1), to thereby obtain 2,3-difluoro-1-hydroxy-4-n-propyl bicyclo[2.2.2]-2-octene (9) (yield=0.51 g, yield ratio=70%) as a colorless clear crystal.

$^1$H-NMR (CDCl$_3$, 300 MHz): 0.94 (t, 3H, J=6.9 Hz), 1.30-1.72 (m, 12H), 1.72 (s, 1H).

Exemplary Compounds (11) and (12) which are the compounds represented by formula (II), and Exemplary Compound (13) which is the compound represented by formula (II) were synthesized. In the scheme below, 4-bromomethyl-1-ethoxy-2,3-difluorobenzene (5) used as a reagent was synthesized by combining the method described in Synlett, 1999, 4, 389 and a publicly-known method. Various solvents and reagents in the scheme below are those commercially available, used without modification.

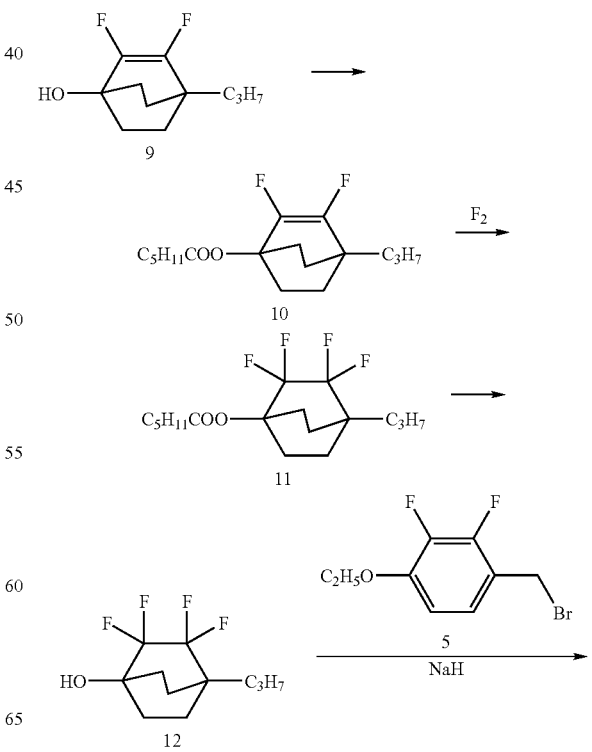

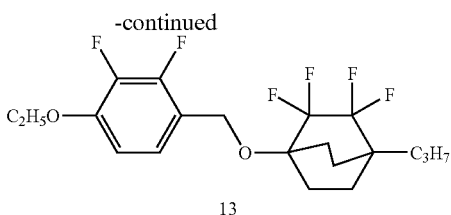

Synthesis of 2,3-Difluoro-1-Pentylcarbonyloxy-4-n-Propylbicyclo[2.2.2]-2-Octene (10)

A mixture of 2,3-Difluoro-1-hydroxy-4-n-propylbicyclo [2.2.2]-2-octene (9) (0.90 g), hexanoyl chloride (0.72 g) and THF (4 mL) was added with dimethylamino pyridine (50 mg) and pyridine (0.70 g), and the mixture was stirred at 65° C., for 2.5 hours. The mixture was added with water (10 mL) and ethyl acetate (50 mL), and the organic layer was washed with pure water. The organic layer was dried over anhydrous sodium sulfate, and the solvent was then evaporated off under reduced pressure, to thereby obtain a crude product. The crude product was purified by basic alumina column chromatography (hexane/ethyl acetate/pyridine=400:10:1), to thereby obtain 2,3-difluoro-1-pentylcarbonyloxy-4-n-propylbicyclo[2.2.2]-2-octene (10) (yield=0.98 g, yield ratio=73%) as a colorless clear oily substance.

$^1$H-NMR (CDCl$_3$, 300 MHz): 0.91 (t, 3H, J=6.9 Hz), 0.94 (t, 3H, J=7.2 Hz), 1.30-1.70 (m, 18H), 2.29 (t, 2H, J=7.5 Hz).

Synthesis of 2,2,3,3-Tetrafluoro-1-Pentylcarbonyloxy-4-n-Propylbicyclo[2.2.2]octane (11)

A mixture of 2,3-difluoro-1-pentylcarbonyloxy-4-n-propylbicyclo[2.2.2]-2-octene (10) (0.64 g), sodium fluoride (0.89 g), and AK225 (1100 g, from Asahi Glass Co., Ltd., trade name) was cooled to −77° C., a fluorine/nitrogen mixed gas (mole ratio=1:4) was blown thereinto at a flow rate of 10 mL/min for 36 minutes, and helium gas was then blown thereinto at a flow rate of 150 mL/min for 30 minutes. The reaction mixture was heated to room temperature, washed with aqueous sodium hydrogen carbonate solution, and dried over anhydrous magnesium sulfate. The solvent was vaporized off, and the residue was purified by silica gel column chromatography (hexane/ethyl acetate=40:1), to thereby obtain 2,2,3,3-tetrafluoro-1-pentylcarbonyloxy-4-n-propyl-bicyclo[2.2.2]octane (11) (yield=0.32 g, yield ratio=45%) as a colorless clear oily substance.

$^1$H-NMR (CDCl$_3$, 300 MHz): 0.82-0.98 (m, 6H), 1.22-2.50 (m, 20H).

Synthesis of 2,2,3,3-Tetrafluoro-1-Hydroxy-4-n-Propylbicyclo[2.2.2]octane (12)

A mixture of 2,2,3,3-tetrafluoro-1-pentylcarbonyloxy-4-n-propylbicyclo[2.2.2]octane (11) (0.30 g), potassium hydroxide (0.10 g), water (0.5 mL), and ethanol (2.0 mL) was stirred at 70° C. for 20 minutes. The mixture was neutralized with hydrochloric acid, added with ethyl acetate (30 mL), and the organic layer was washed with aqueous sodium hydrogen carbonate solution. The organic layer was dried over anhydrous magnesium sulfate, and the solvent was then vaporized off under reduced pressure, to thereby obtain a crude product. The crude product was purified by silica gel column chromatography (hexane/ethyl acetate=3:1), to thereby obtain 2,2,3,3-tetrafluoro-1-hydroxy-4-n-propylbicyclo[2.2.2]octane (12) (yield=0.20 g, yield ratio=94%) as a colorless clear solid.

$^1$H-NMR (CDCl$_3$, 300 MHz): 0.91 (t, 3H, J=6.9 Hz), 1.22-2.00 (m, 13H).

Synthesis of 1-(4'-Ethoxy-2',3'-Difluorophenyl)Methyloxy-2,2,3,3-Tetrafluoro-4-n-Propylbicyclo[2.2.2]octane (13)

2,2,3,3-Tetrafluoro-1-hydroxy-4-n-propylbicyclo[2.2.2] octane (12) (0.15 g), and 4-bromomethyl-1-ethoxy-2,3-difluorobenzene (5) (0.31 g) were added to a dimethyl formamide suspension (2.0 mL) of sodium hydride (18 mg), the mixture was stirred at room temperature for 6 hours, and then added with saturated aqueous ammonium chloride solution to thereby terminate the reaction. The organic layer was extracted three times with ethyl acetate, the organic layers were combined, and washed with saturated sodium chloride solution. The organic layer was dried over anhydrous sodium sulfate, and the solvent was vaporized off under reduced pressure to thereby obtain a crude product. The crude product was purified by silica gel column chromatography (hexane/ethyl acetate=9:1), to thereby obtain 1-(4'-ethoxy-2',3'-difluorophenyl)methyloxy-2,2,3,3-tetrafluoro-4-n-propyl bicyclo[2.2.2]octane (13) (yield=0.15 g, yield ratio=58%) as a colorless clear crystal.

$^1$H-NMR (CDCl$_3$, 300 MHz): 0.90 (t, 3H, J=6.9 Hz), 1.22-2.00 (m, 14H), 4.09 (q, 2H, J=7.2 Hz), 4.53 (s, 2H), 6.69 (ddd, 1H, J=2.1, 7.5, 8.9 Hz), 7.04 (dt, 1H, J=2.2, 7.4 Hz).

Example 4

Measurement of Dielectric Anisotropy Δ∈

Dielectric anisotropy Ac of Exemplary Compounds (6), (8) and (13) prepared in Examples 1 to 3, and bicyclooctane compound (14) shown below, which is a comparative compound disclosed in German Patent No. DE3906058, was measured. Results are shown in Table below.

Comparative Example

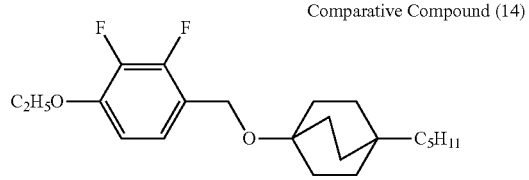

| Compound No. | Δε | Remarks |
|---|---|---|
| Exemplary Compound (6) | −6.2 | Compound of Example 1 |
| Exemplary Compound (8) | −5.0 | Compound of Example 2 |
| Exemplary Compound (13) | −7.9 | Compound of Example 3 |
| Comparative Compound (14) | −2.8 | Comparative Compound |

It can be understood from the results listed in Table in the above, that Exemplary Compounds (6), (8) and (13), which are the difluorobicyclo[2.2.2]octane compounds of the present invention represented by formula (II), have sufficiently larger negative values of dielectric anisotropy Δ∈ as compared with that of Comparative Compound (14), which is a publicly known difluorobicyclo[2.2.2]octane compound.

More specifically, the fluorobicyclo[2.2.2]octane compounds represented by formula (II), which are the compounds of the present invention, have larger negative values of dielectric anisotropy Δ∈ as compared with that of the conventional bicyclooctane compound (containing the bicyclo[2.2.2]octane skeleton, but not substituted on the skeleton with fluorine atom(s)), and may preferably be adoptable to liquid crystal display element for which rapid response is required.

What is claimed is:

1. A liquid crystal composition comprising at least one compound having a fluorobicyclo[2.2.2]octane skeleton represented by formula (I) below:

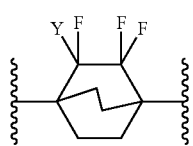
(I)

wherein, Y represents a hydrogen atom or fluorine atom.

2. The liquid crystal composition of claim 1, wherein the compound further comprises one cyclic linking group selected from cyclic hydrocarbon group and aromatic group.

3. The liquid crystal composition of claim 1, wherein the compound is represented by formula (II) below:

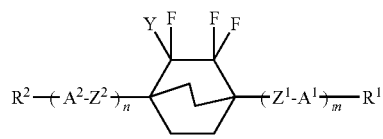
(II)

wherein, Y represents a hydrogen atom or fluorine atom; each of $R^1$ and $R^2$ independently represents a hydrogen atom, alkyl group having 1 to 12 carbon atoms, or alkenyl group having 2 to 12 carbon atoms, one $CH_2$ group or non-neighboring two or more $CH_2$ groups contained in these groups may be substituted by oxygen (O) atom(s) or sulfur (S) atom(s), and one or more hydrogen atoms contained in these groups may be substituted by fluorine atom(s) or chlorine atom(s); each of $A^1$ and $A^2$ independently represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH groups contained in this group may be substituted by nitrogen (N) atom(s), and, one or more hydrogen atoms contained in this group may be substituted by halogen atom(s) or CN), or, (d) 1,4-bicyclo[2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s), or bromine atom(s)); each of $Z^1$ and $Z^2$ independently represents —COO—, —OCO—, —CH$_2$O—, —OCH$_2$—, —CF$_2$O—, —OCF$_2$—, —CF$_2$CF$_2$—, —CF=CF—, —C≡C—, —CH=CH—, —CH$_2$CH$_2$—, or, single bond; each of m and n independently represents 0, 1 or 2, two ($A^1$)s, two ($A^2$)s, two ($Z^1$)s or two ($Z^2$)s for m=2 or n=2 may independently be same with, or different from each other.

4. The liquid crystal composition according to claim 3, wherein the compound comprising wherein at least either one of $A^1$ and $A^2$ in formula (II) is substituted by a trans-1,4-cyclohexylene group, or, a 1,4-phenylene group which may be substituted by one or more fluorine atom(s).

5. A liquid crystal display device comprising:
two polarizing films disposed so that the absorption axes thereof are orthogonal to each other;
a liquid crystal cell comprising a pair of substrates, and liquid crystal layer held between the pair of substrates, and disposed between the two polarizer films, and
the liquid crystal layer comprises the liquid crystal composition described in claim 1.

6. The liquid crystal display device of claim 5, which employs a VA mode.

7. A fluorobicyclo[2.2.2]octane compound represented by formula (III) below:

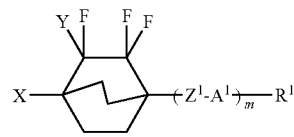
(III)

wherein, Y represents a hydrogen atom or fluorine atom; X represents a halogen atom or $OR^3$ ($R^3$ represents a hydrogen atom or protective group of hydroxyl group, or, a group which functions as an elimination group in a form of $OR^3$); $R^1$ represents a hydrogen atom, alkyl group having 1 to 12 carbon atoms, or alkenyl group having 2 to 12 carbon atoms, one $CH_2$ group or non-neighboring two or more $CH_2$ groups contained in these groups may be substituted by oxygen (O) atom(s) or sulfur (S) atom(s), one or more hydrogen atoms contained in these groups may be substituted by fluorine atom(s) or chlorine atom(s); $A^1$ represents (a) trans-1,4-cyclohexylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one $CH_2$ group or non-neighboring two $CH_2$ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH groups contained in this group may be substituted by nitrogen (N) atom(s), and, one or more hydrogen atoms contained in this group may be substituted by halogen atom(s) or CN), or, (d) 1,4-bicyclo[2.2.2]octylene group (one $CH_2$ group or non-neighboring two or more $CH_2$ groups contained in this group may be substituted by oxygen (O) atom(s) or sulfur (S) atom(s), and, one or more hydrogen atoms contained in this group may be substituted by CN, chlorine atom(s), or bromine atom(s)); $Z^1$ represents —COO—, —OCO—, —CH$_2$O—, —OCH$_2$—, —CF$_2$CF$_2$—, —CF=CF—, —CH=CH—, —CH$_2$CH$_2$—, or, single bond; and m represents 0, 1 or 2.

8. The fluorobicyclo[2.2.2]octane compound of claim 7, wherein X represents a halogen atom, OH, OSO$_2$R, or OCOR (R represents an alkyl group having 1 to 12 carbon atoms, or phenyl group, one or more hydrogen atoms contained in these groups may be substituted by fluorine atom(s), chlorine atom(s), or alkyl group(s) having 1 to 12 carbon atoms).

9. A method of producing a fluorobicyclo[2.2.2]octane compound having a fluorobicyclo[2.2.2]octane skeleton represented by formula (I) below:

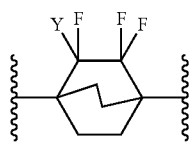

(I)

wherein, Y represents a hydrogen atom or fluorine atom; comprising carrying out reaction of a compound, which has a fluorobicyclo[2.2.2]octene skeleton represented by formula (IV) below:

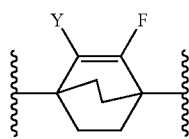

(IV)

wherein, Y represents a hydrogen atom or fluorine atom; with fluorine gas.

10. A method of producing a fluorobicyclo[2.2.2]octane compound which is described in claim 7, comprising carrying out reaction of a fluorobicyclo[2.2.2]octene compound which is represented by formula (VI) below:

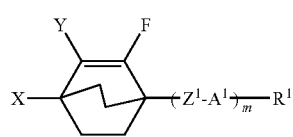

(VI)

wherein, X represents a halogen atom or OR³ (R³ represents a hydrogen atom or protective group of hydroxyl group, or, a group which functions as an elimination group in a form of OR³), and Y, R¹, A¹, Z¹ and m are equally defined as those in formula (III) described in claim 7;
with fluorine gas.

11. A fluorobicyclo[2.2.2]octane compound represented by formula (II)' below:

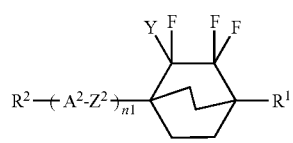

(II)' wherein, Y represents a hydrogen atom or fluorine atom; each of R¹ and R² independently represents a hydrogen atom, alkyl group having 1 to 12 carbon atoms, or alkenyl group having 2 to 12 carbon atoms, one CH₂ group or non-neighboring two or more CH₂ groups contained in these groups may be substituted by oxygen (O) atom(s) or sulfur (S) atom(s), and one or more hydrogen atoms contained in these groups may be substituted by fluorine atom(s) or chlorine atom(s); A² independently represents (a) trans-1,4-cyclohexylene group (one CH₂ group or non-neighboring two CH₂ groups contained in this group may be substituted by oxygen (O) atom(s) or sulfur (S) atom(s), and, one or more hydrogen atoms contained in this group may be substituted by halogen atom(s) or CN), (b) 1,4-cyclohexenylene group (one CH₂ group or non-neighboring two CH₂ groups contained in this group may be substituted by oxygen (O) atom(s) or sulfur (S) atom(s), and, one or more hydrogen atoms contained in this group may be substituted by halogen atom(s) or CN), (c) 1,4-phenylene group (one or more CH groups contained in this group may be substituted by nitrogen (N) atom(s), and, one or more hydrogen atoms contained in this group may be substituted by halogen atom(s) or CN), or, (d) 1,4-bicyclo[2.2.2]octylene group (one CH₂ group or non-neighboring two or more CH₂ groups contained in this group may be substituted by oxygen (O) atom(s) or sulfur (S) atom(s), and, one or more hydrogen atoms contained in this group may be substituted by CN, chlorine atom(s), or bromine atom(s)); Z² independently represents —COO—, —OCO—, —CH₂O—, —OCH₂—, —CF₂O—, —OCF₂—, —CF₂CF₂—, —CF=CF—, —C≡C—, —CH=CH—, —CH₂CH₂—, or, single bond; n1 represents 1 or 2, two (A²)s, or two (Z²)s for n1=2 may independently be same with, or different from each other.

12. The fluorobicyclo[2.2.2]octane compound of claim 11, wherein at least either one of A¹ and A² in formula (II) Is substituted by a trans-1,4-cyclohexylene group, or, a 1,4-phenylene group which may be substituted by one or more fluorine atom(s).

13. A method of producing a fluorobicyclo[2.2.2]octane compound which is described in claim 11, comprising carrying out reaction of a fluorobicyclo[2.2.2]octene compound which is represented by formula (V)' below:

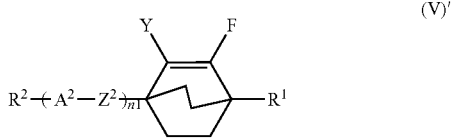

(V)' wherein, Y, R², A², Z², and n1 are equally defined as those in formula (II)' described in claim 11;
with fluorine gas.

* * * * *